US009623738B2

(12) United States Patent
Ueoka et al.

(10) Patent No.: US 9,623,738 B2
(45) Date of Patent: Apr. 18, 2017

(54) VEHICLE BODY REAR PORTION STRUCTURE FOR AUTOMOBILE

(71) Applicant: MAZDA MOTOR CORPORATION, Hiroshima (JP)

(72) Inventors: Tetsuya Ueoka, Aki-gun (JP); Norifumi Takasuka, Hiroshima (JP); Yoshihiko Ono, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/976,495

(22) Filed: Dec. 21, 2015

(65) Prior Publication Data

US 2016/0185197 A1  Jun. 30, 2016

(30) Foreign Application Priority Data

Dec. 24, 2014  (JP) .................. 2014-259783
Dec. 24, 2014  (JP) .................. 2014-259784
Dec. 24, 2014  (JP) .................. 2014-259785

(51) Int. Cl.
*B60J 7/20*   (2006.01)
*B60J 7/14*   (2006.01)

(52) U.S. Cl.
CPC  *B60J 7/143* (2013.01); *B60J 7/20* (2013.01)

(58) Field of Classification Search
CPC ................................ B60J 7/143; B60J 7/20
See application file for complete search history.

(56) References Cited

U.S. PATENT DOCUMENTS

| 5,197,778 A * | 3/1993 | Burst ............... B60J 7/202 296/107.08 |
| 6,145,909 A * | 11/2000 | Staley ............... B60J 7/20 296/107.08 |
| 6,293,605 B2 * | 9/2001 | Neubrand ......... B62D 25/10 280/756 |
| 6,460,913 B2 * | 10/2002 | Fischer ............. B60J 7/1265 296/107.08 |

(Continued)

FOREIGN PATENT DOCUMENTS

| DE | 10021333 C1 * | 8/2001 | ........... B60J 7/143 |
| DE | 10159390 C1 * | 11/2002 | ........... B60J 7/143 |

(Continued)

*Primary Examiner* — Glenn Dayoan
*Assistant Examiner* — Paul Chenevert
(74) *Attorney, Agent, or Firm* — Studebaker & Brackett PC

(57) ABSTRACT

The present application discloses a vehicle body rear portion structure for an automobile configured so that the rear deck cover opens or closes above a wheelhouse. The vehicle body rear portion structure includes a rear fender including an upper perimeter extending on an inner side in a vehicle width direction above the wheelhouse; a deck member extending in the vehicle width direction; and a support structure which supports the rear deck cover. The upper perimeter of the rear fender is connected to the deck member. The support structure includes a link mechanism, which opens and closes the rear deck cover, and a bracket portion including a mounting seat situated on an inner side with respect to a top portion of the wheelhouse in the vehicle width direction, the bracket portion supporting the link mechanism. The link mechanism is supported on the wheelhouse via the bracket portion.

15 Claims, 15 Drawing Sheets

(56) References Cited

U.S. PATENT DOCUMENTS

| | | | | |
|---|---|---|---|---|
| 6,866,327 B2* | 3/2005 | Willard | ............... | B60J 7/202 |
| | | | | 296/107.08 |
| 7,032,952 B2* | 4/2006 | Dilluvio | ............... | B60J 7/205 |
| | | | | 296/107.08 |
| 7,032,964 B2* | 4/2006 | Kirk | ............... | B60J 7/20 |
| | | | | 211/41.1 |
| 7,150,491 B2* | 12/2006 | Perakis | ............... | B60J 1/1823 |
| | | | | 296/107.08 |
| 7,401,839 B2* | 7/2008 | Hiyama | ............... | B60J 7/145 |
| | | | | 296/108 |
| 8,172,303 B2* | 5/2012 | Odoi | ............... | B60J 7/1855 |
| | | | | 296/107.08 |
| 2005/0006925 A1* | 1/2005 | Hahn | ............... | B60J 1/1823 |
| | | | | 296/107.07 |
| 2016/0031306 A1* | 2/2016 | Diehl | ............... | B60J 7/1265 |
| | | | | 296/136.06 |
| 2016/0236559 A1* | 8/2016 | Senoo | ............... | B60J 7/202 |

FOREIGN PATENT DOCUMENTS

| | | | |
|---|---|---|---|
| DE | 102006050753 A1 * | 4/2008 | ............... B60J 7/20 |
| JP | H11-020561 A | 1/1999 | |
| JP | 2005-186828 A | 7/2005 | |
| JP | 2007-084018 A | 4/2007 | |
| JP | 4654758 B2 | 3/2011 | |
| JP | 2014-189259 A | 10/2014 | |

* cited by examiner

VEHICLE BODY REAR PORTION STRUCTURE FOR AUTOMOBILE

TECHNICAL FIELD

The present invention relates to a vehicle body rear portion structure for an automobile.

BACKGROUND ART

Generally, a rear deck cover of an open car provided with a storable hard top roof is supported above a wheelhouse. The rear deck cover is displaceable between an opened position and a closed position.

A rear deck cover of a conventional structure for supporting a deck cover of an automobile is supported immediately above a wheelhouse. A designer may employ a vehicle design so that a vehicle chamber rear portion (a rear deck cover) is tapered rearward. If the designer tries to increase rigidity of a vehicle body rear portion of such a vehicle design, a rear fender panel may overlap a top portion of the wheelhouse in the vertical direction. In this case, it is difficult for the rear deck cover to be supported immediately above the wheelhouse.

A rear deck cover of a certain type of open car is designed so that the rear deck cover is operable only when the open car is stopped. However, there is a strong demand for operating a rear deck cover when an open car runs at a low speed. In this case, a large load may also act on the rear deck cover and a link mechanism which opens and closes the rear deck cover.

A link mechanism may be mounted on a wheelhouse by a bracket. In this case, the designer may thicken the bracket, which is welded to the wheelhouse, to improve load resistance performance. If the designer gives a large value to the thickness dimension of the bracket, a welded portion between the wheelhouse and the bracket may be peeled off when a large load acts on the bracket and the wheelhouse.

The designer may give a large value to the thickness dimension of the wheelhouse in place of mounting a bracket. In this case, there may be an excessive increase in weight of the vehicle. The designer may weld a bracket to a wheelhouse in an oblique direction so as to reduce load acting in a direction of causing exfoliation of the welded portion. However, if the designer employs an oblique mounting structure between a bracket and a wheelhouse, a link mechanism which opens and closes a rear deck cover has to be mounted to the bracket in an oblique direction. In this case, it may be impossible to efficiently manufacture a vehicle body rear portion structure.

JP 2007-84018 A discloses a structure for supporting a link mechanism of a rear deck cover. The link mechanism is supported by a top portion of a rear wheelhouse. If the designer applies a vehicle design to the structure disclosed in JP 2007-84018 A so that a rear deck cover is tapered rearward of the vehicle, there may be the aforementioned drawbacks.

JP 2014-189259 A discloses a vehicle body side portion structure of an open car. According to JP 2014-189259 A, upper and lower bulk members respectively connect a pillar outer member and a pillar inner member to an upper portion and a lower portion of a center pillar. JP 2014-189259 A discloses a mounting bracket to mount a link mechanism for opening and closing a roof. The mounting bracket is mounted inside a vehicle chamber between the upper and lower bulk members of the pillar inner member. The mounting bracket is formed into a box shape. Since the mounting bracket is connected to the lower bulk member, the support portion of the link mechanism is reinforced.

The link mechanism of the conventional structure disclosed in JP 2014-189259 A is not supported on a wheelhouse but is supported on the center pillar.

With regard to a general vehicle body rear portion structure, an upper rear member extending in the vehicle width direction is mounted between left and right body side panels situated in a vehicle body rear portion.

Rearward arrangement of an upper rear member contributes to securing an auxiliary device installation space to enlarge a vehicle chamber without extending an entire length of a vehicle. In addition, the rearward arrangement of the upper rear member also contributes to securing an opening area of a trunk room. Therefore, there is a strong demand for the rearward arrangement of the upper rear member.

On the other hand, there is a strong demand for arranging a rear end near a vehicle body front portion. If the rear end is arranged near the vehicle body front portion, there is a decrease in weight of the vehicle body so as to improve turning performance of the vehicle.

If the designer mounts the upper rear member in the vehicle body rear portion, and if the designer mounts the rear end near a vehicle body front portion to meet the aforementioned demand, a fuel supply port may be situated on a relatively front side. A fuel feed pipe for supplying fuel to a fuel tank is formed in the fuel supply port. The fuel feed pipe may obstruct forming a large trunk space.

JP 2005-186828 A discloses an open car. The open car is provided with a rear deck member in correspondence to an upper rear member. A fuel supply port is formed in a vehicle body side portion behind the rear deck member.

The fuel supply port of a conventional structure disclosed in JP 2005-186828 A is situated behind the rear deck member. The fuel feed pipe connecting the fuel supply port to a fuel tank may obstruct forming a large trunk space. Accordingly, the designer may not arrange the rear end near the vehicle body front portion enough to obtain effects of a reduction in weight of a vehicle body or improvement of turning performance of a vehicle because of the presence of the fuel feed pipe.

JP H11-20561 A discloses a structure for supporting a jack, which is used as an auxiliary device. The jack is supported by a rear side upper portion of an inner member forming a wheelhouse. A front portion of the jack is supported at a position higher than a rear portion of the jack (so-called slant support structure).

However, JP H11-20561 A fails to disclose a coupling structure between an upper rear member and a jack.

A space for storing an auxiliary device is formed in front of the upper rear member. A trunk room is formed behind the upper rear member. Therefore, there is a demand for securing a large capacity for the front and rear spaces.

A reduction in thickness of an upper rear member contributes to giving a large capacity for a space, in which an auxiliary device is stored, and a space for a trunk room. However, the reduction in thickness of the upper rear member may result in a decrease in rigidity of the upper rear member. An increase in thickness of a panel for use in forming an upper rear member may increase rigidity of the thinned upper rear member. In this case, a large stress may be, however, concentrated on a member (hereinafter, called as a peripheral member) around the upper rear member. Therefore, the designer has to prepare a structure for reinforcing the peripheral member. Addition of the reinforcing structure may result in an increase in weight and cost of the vehicle body. Without addition of the reinforcing structure, cracks may happen to the peripheral member, and a welded portion welded by spot welding may be peeled off.

JP 4,654,758 B discloses an upper deck member. The upper deck member includes a front panel, an upper panel and a rear panel. The front panel, the upper panel and the rear panel form a closed section structure. The upper deck member of the closed section structure is reinforced by a gusset.

JP 4,654,758 B fails to disclose technical ideas about how to avoid stress concentration on a peripheral member.

JP 2005-186828 A discloses a rear deck member. The rear deck member is mounted between upper portions of a pair of left and right quarter panels situated in a vehicle body rear portion. An inner panel forming a pair of left and right wheelhouses includes a suspension mounting portion situated below both ends of the rear deck member. A pair of left and right gusset members connects between the rear deck member and a proximal portion of the suspension mounting portion of the inner panel. Each of the gusset members is inclined inward in the vehicle width direction from the inner panel toward the rear deck member.

JP 2005-186828 A also fails to disclose technical ideas about how to avoid stress concentration on a peripheral member.

SUMMARY OF INVENTION

An object of the invention is to provide techniques for an increase in support strength of a link mechanism, which opens and closes a rear deck cover, without an excessive increase in weight of a vehicle body. Another object of the invention is to provide a vehicle body rear portion structure for an automobile which enables to form a large auxiliary device installation space on a front side of a deck member with high rigidity and reduced thickness. The vehicle body rear portion structure for an automobile of the invention may provide a large space for a trunk room. In addition, the vehicle body rear portion structure for an automobile of the invention provides a high degree of freedom about a layout of a fuel supply port. Further, the vehicle body rear portion structure for an automobile of the invention increases the rigidity not only of the vehicle body but also of a portion of a vehicle body side portion where a fuel supply port is formed. The deck member of the invention is less likely to cause stress concentration on a peripheral member. This allows for a designer to omit reinforcement for the peripheral member.

A vehicle body rear portion structure for an automobile according to one aspect of the invention supports a rear deck cover of an open car which is opened and closed above a wheelhouse. The vehicle body rear portion structure includes a rear fender having an upper perimeter extending on an inner side in a vehicle width direction above the wheelhouse; a deck member extending in the vehicle width direction; and a support structure which supports the rear deck cover. The upper perimeter is connected to the deck member. The support structure includes a link mechanism, which opens and closes the rear deck cover, and a bracket portion including a mounting seat situated on an inner side with respect to a top portion of the wheelhouse in the vehicle width direction, the bracket portion supporting the link mechanism. The link mechanism is supported on the wheelhouse via the bracket portion.

According to the aforementioned techniques, it is possible to increase support strength of the link mechanism which opens and closes the rear deck cover without an excessive increase in weight of the vehicle body.

These and other objects, features and advantages of the present invention will become more apparent upon reading the following detailed description along with the accompanying drawings.

DESCRIPTION OF EMBODIMENTS

Figure 1:
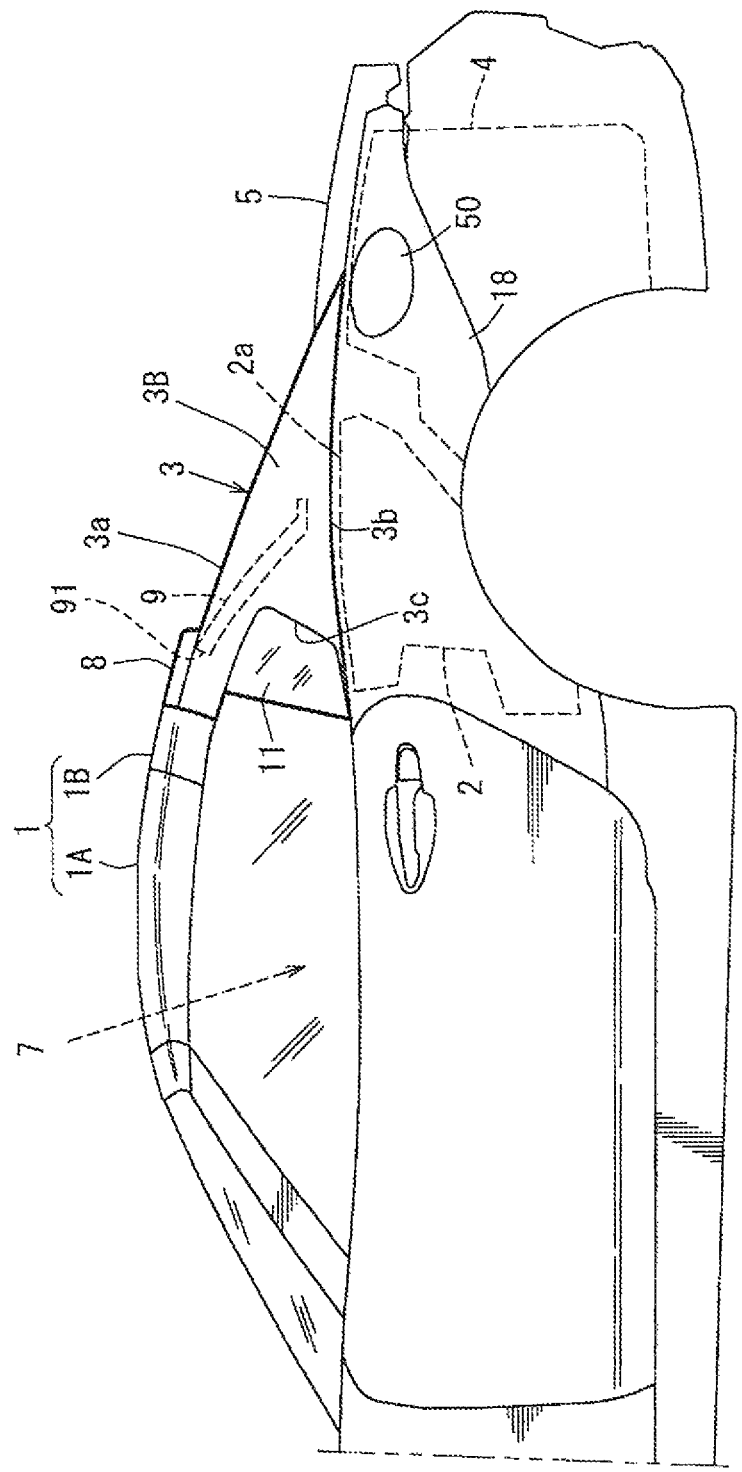
FIG. 1 is a side view of an automobile provided with a vehicle body rear portion structure.
Figure 2:
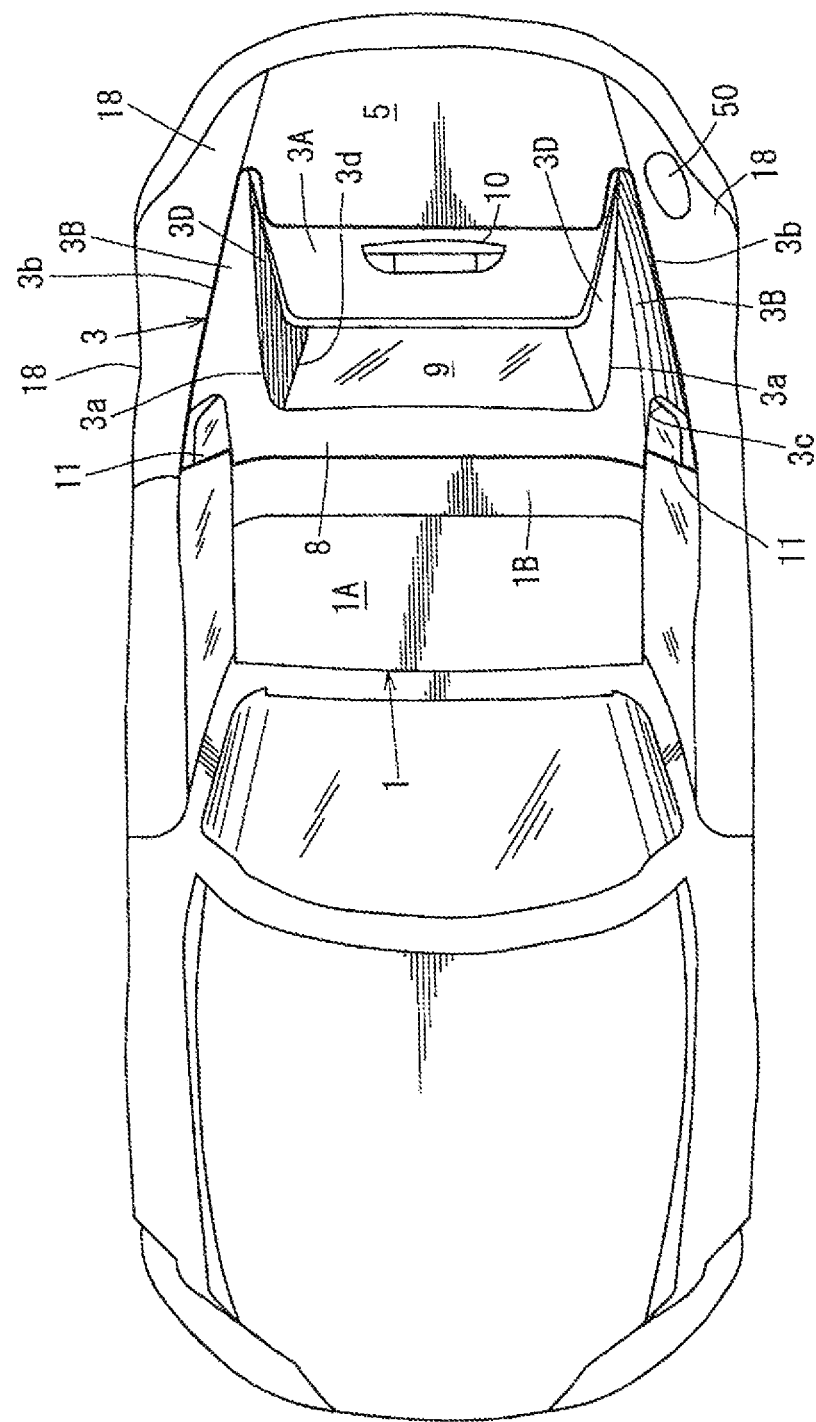
FIG. 2 is a plan view of the automobile shown in FIG. 1.
Figure 3:
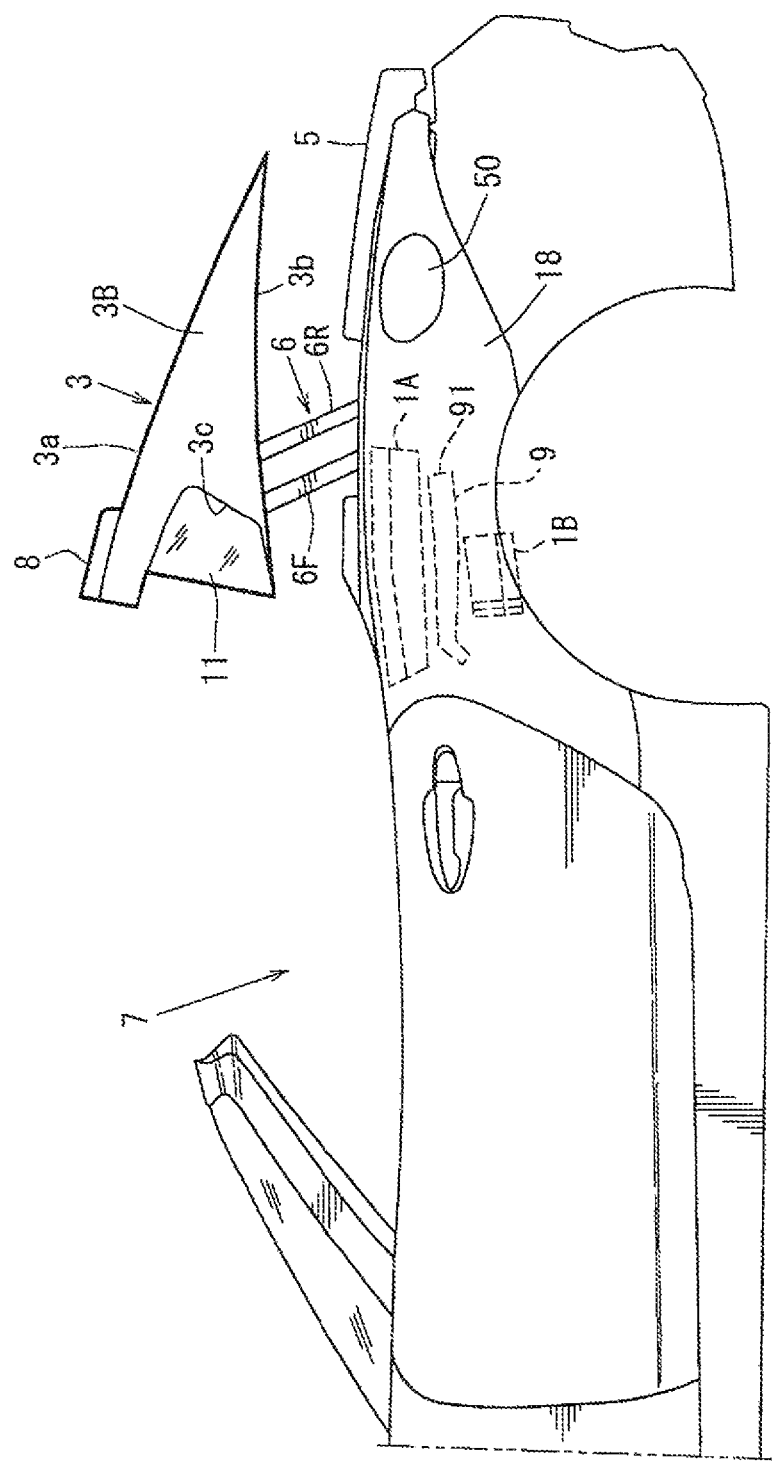
FIG. 3 is a side view of the automobile shown in FIG. 1 with the deck cover in a raised position.
Figure 4:
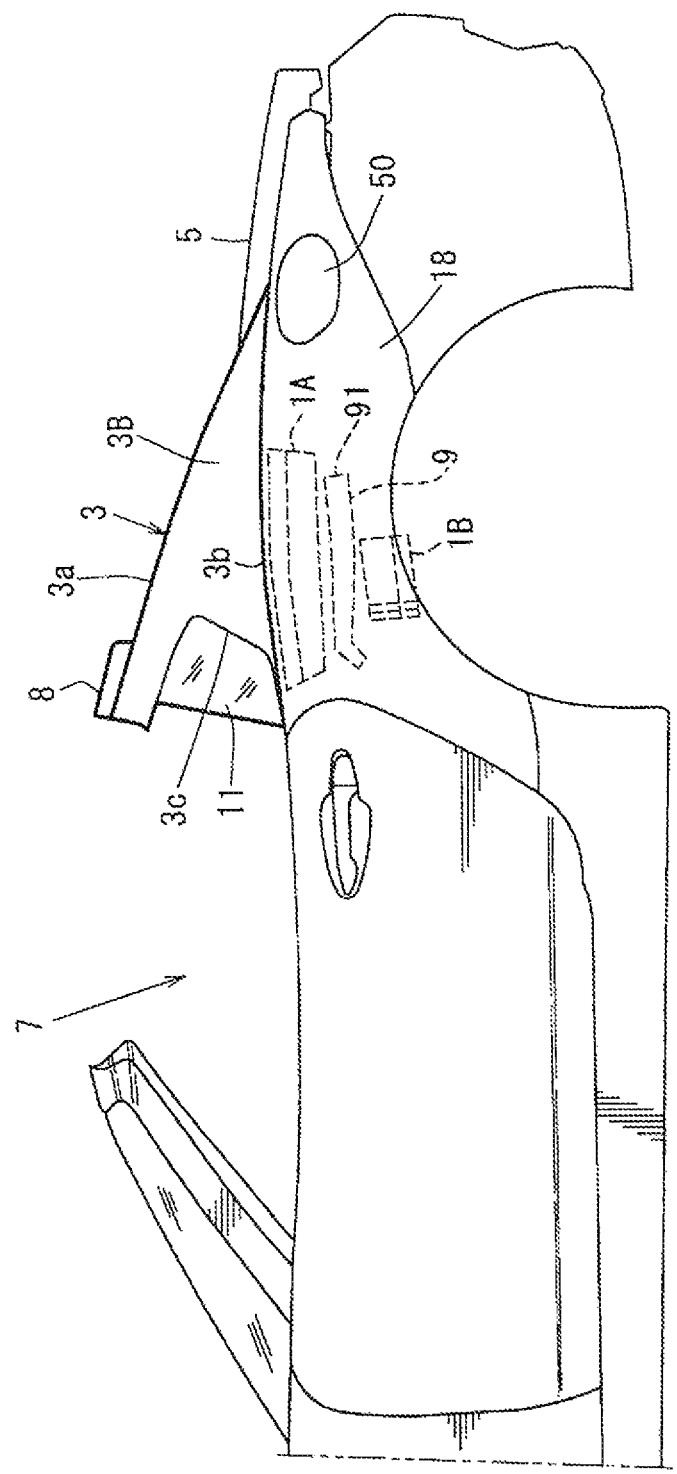
FIG. 4 is a side view of the automobile shown in FIG. 1.

An exemplificative embodiment of a vehicle body rear portion structure for an automobile is described in details with reference to the drawings. The drawings show a vehicle body rear portion structure including a structure for supporting a deck cover of an automobile. FIG. 1 is a side view of an automobile provided with a vehicle body rear portion structure. A roof of the automobile shown in FIG. 1 is in a closed position at which a passenger room is closed. In the following description, the state of the roof shown in FIG. 1 is called as "roof closed state" or "closed state". FIG. 2 is a plan view of the automobile shown in FIG. 1. FIG. 3 is a side view of the automobile shown in FIG. 1. The roof of the automobile shown in FIG. 3 is moved from the closed state to an opened position at which the passenger room is opened. FIG. 4 is a side view of the automobile shown in FIG. 1. The roof of the automobile shown in FIG. 4 reaches the opened position. The state of the roof shown in FIG. 4 is called as "roof opened state" or "opened state". The automobile shown in FIGS. 1 to 4 is a 2-seater open car.

In the following description, the terms such as "front" and "front side" mean the front side in a running direction of an automobile running in the forward direction. The terms such as "rear" and "rear side" mean the rear side in the running direction of the automobile running in the forward direction. The terms such as "left", "right", "outer side", "inner side" and "middle" mean a positional relationship in the vehicle width direction (i.e. a direction perpendicularly intersecting the running direction of the automobile running in the forward direction). The terms such as "up" and "down" mean a positional relationship in the height direction of the automobile.

As shown in FIGS. 1 to 4, the vehicle body rear portion structure is provided with a roof 1, a roof storage chamber 2, a rear deck cover 3, a trunk room 4, a trunk lid 5, a link mechanism 6 (c.f. FIG. 3) including a parallel link structure, which opens and closes the rear deck cover 3, and a roof link mechanism (not shown), which opens and closes the roof 1 and a rear window 9.

The roof 1 is supported on a vehicle body, the roof 1 being displaceable between the roof closed state (c.f. FIGS. 1 and 2), at which a passenger room 7 (i.e. a vehicle chamber) is covered, and the roof opened state (c.f. FIG. 4), at which the roof 1 is stored in the roof storage chamber 2 so that the passenger room 7 is opened.

The roof 1 is a hard top movable roof. The roof 1 is provided with a front roof 1A and a middle roof 1B.

As shown in FIG. 1, the front roof 1A is situated above the passenger room 7 to cover the passenger room 7. The middle roof 1B is continuously situated behind the front roof 1A in the roof closed state.

In the roof closed state shown in FIGS. 1 and 2, a plate-shaped rear header 8 is continuously situated behind the middle roof 1B, the plate-shaped rear header 8 being used as a part of the rear deck cover 3. The rear window 9 (c.f. FIG. 2) is continuously situated below the rear header 8.

In the roof closed state shown in FIGS. 1 and 2, the front roof 1A, the middle roof 1B, the rear header 8 and the rear window 9 are in firm contact with each other via a seal member (not shown). On the other hand, in the roof opened state shown in FIG. 4, the front roof 1A, the middle roof 1B, the rear header 8 and the rear window 9 are separated from each other.

The front roof 1A, the middle roof 1B, and the left and right portions of the rear window 9 are connected to each other via the roof link mechanism (not shown) which opens and closes the roof 1 and the rear window 9. In addition, the front roof 1A, the middle roof 1B and the rear window 9 are connected to the vehicle body via the roof link mechanism. The rear header 8 is not connected to the roof link mechanism.

The roof storage chamber 2 (c.f. FIG. 1) is provided between the passenger room 7 and the trunk room 4, which is formed behind the passenger room 7. The roof storage chamber 2 is a space in which the roof 1 (the front roof 1A and the middle roof 1B) and the rear window 9 are stored. As shown by the dotted lines in FIGS. 3 and 4, the front roof 1A, the middle roof 1B and the rear window 9 are stored in the roof storage chamber 2 in a state that the front roof 1A, the middle roof 1B and the rear window 9 are overlapped in the vertical direction.

The rear deck cover 3 is displaceable between a position, at which an opening portion 2a (c.f. FIG. 1) of the roof storage chamber 2 is covered, and a position, at which the opening portion 2a is opened. The rear deck cover 3 is provided with a base portion 3a, left and right bulging portions 3B, 3B, the rear header 8, and a stop lamp 10 (a high-mount stop lamp) (c.f. FIG. 2).

The base portion 3A is a plate-like portion having a trapezoidal shape in the plan view. The front portion of the base portion 3A is shorter than the rear portion of the base portion 3A in length in the vehicle width direction (c.f. FIG. 2). The stop lamp 10 is situated on the upper surface of the middle portion of the base portion 3A in the vehicle width direction.

The bulging portion 3B is integrally formed with the base portion 3A on the left end of the base portion 3A (one end of the base portion 3A in the vehicle width direction) and on the right end of the base portion 3A (the other end of the base portion 3A in the vehicle width direction). The bulging portion 3B projects upward from the base portion 3A. The bulging portion 3B extends in the vehicle front-rear direction.

The bulging portion 3B is substantially triangular in the side view of the vehicle. An upper perimeter portion 3a of the bulging portion 3B is inclined obliquely downward from the front portion to the rear portion of the bulging portion 3B. A lower end 3b of the bulging portion 3B extends substantially horizontally. Each of the upper perimeter portion 3a and the lower end 3b is slightly bulged upward. A notch 3c recessed rearward is formed in the front portion of the triangular bulging portion 3B. A quarter window 11 is situated in the notch 3c.

The rear window 9 includes an end perimeter 91. In the roof closed state shown in FIG. 1, the end perimeter 91 forms an upper end of the rear window 9. In the roof closed state, the rear window 9 is inclined forward and upward toward the end perimeter 91 in the side view of the vehicle. The notch 3c extends rearward than the end perimeter 91 of the rear window 9 in the roof closed state (c.f. FIG. 1). In the roof closed state, the slope of the upper perimeter portion 3a of the bulging portion 3B is gentler than the slope of the rear window 9. Accordingly, an inner wall 3D is formed behind a lateral portion of the rear window 9 (c.f. FIG. 2). The inner wall 3D forms a side surface of the bulging portion 3B (an inner side surface of the bulging portion 3B in the vehicle width direction). The inner wall 3D is substantially triangular. As shown in FIG. 2, the inner wall 3D intervenes between the stop lamp 10 and the notch 3c.

The rear end of the bulging portion 3B projects rearward than the rear end of the base portion 3A (c.f. FIG. 2). The projecting portion of the bulging portion 3B has a tapered shape. The dimensions (the width and the height) of the projecting portion decrease in the vehicle width direction and in the vertical direction as the projecting portion extends rearward.

Upper ends 3a of the left and right bulging portions 3B, 3B are connected by the rear header 8 extending in the vehicle width direction. The left bulging portion 3B, the rear header 8 and the right bulging portion 3B are integrally formed.

The left bulging portion 3B functions as a left rear pillar. The right bulging portion 3B functions as a right rear pillar. In the embodiment, the rear header 8 is connected to the upper end of the bulging portion 3B. Alternatively, the rear header 8 may be connected to a portion of the bulging portion 3B on the upper side than the lower end of the bulging portion 3B.

A rectangular area surrounded by the left and right bulging portions 3B, 3B, the rear header 8 and the base portion 3A forms an opening portion 3d in which the rear window 9 appears (c.f. FIGS. 2 and 4)

As shown in the plan view of FIG. 2, the left and right bulging portions 3B, 3B gradually extend inward in the vehicle width direction as extending toward the opening portion 3d and the notch 3c.

Figure 8:
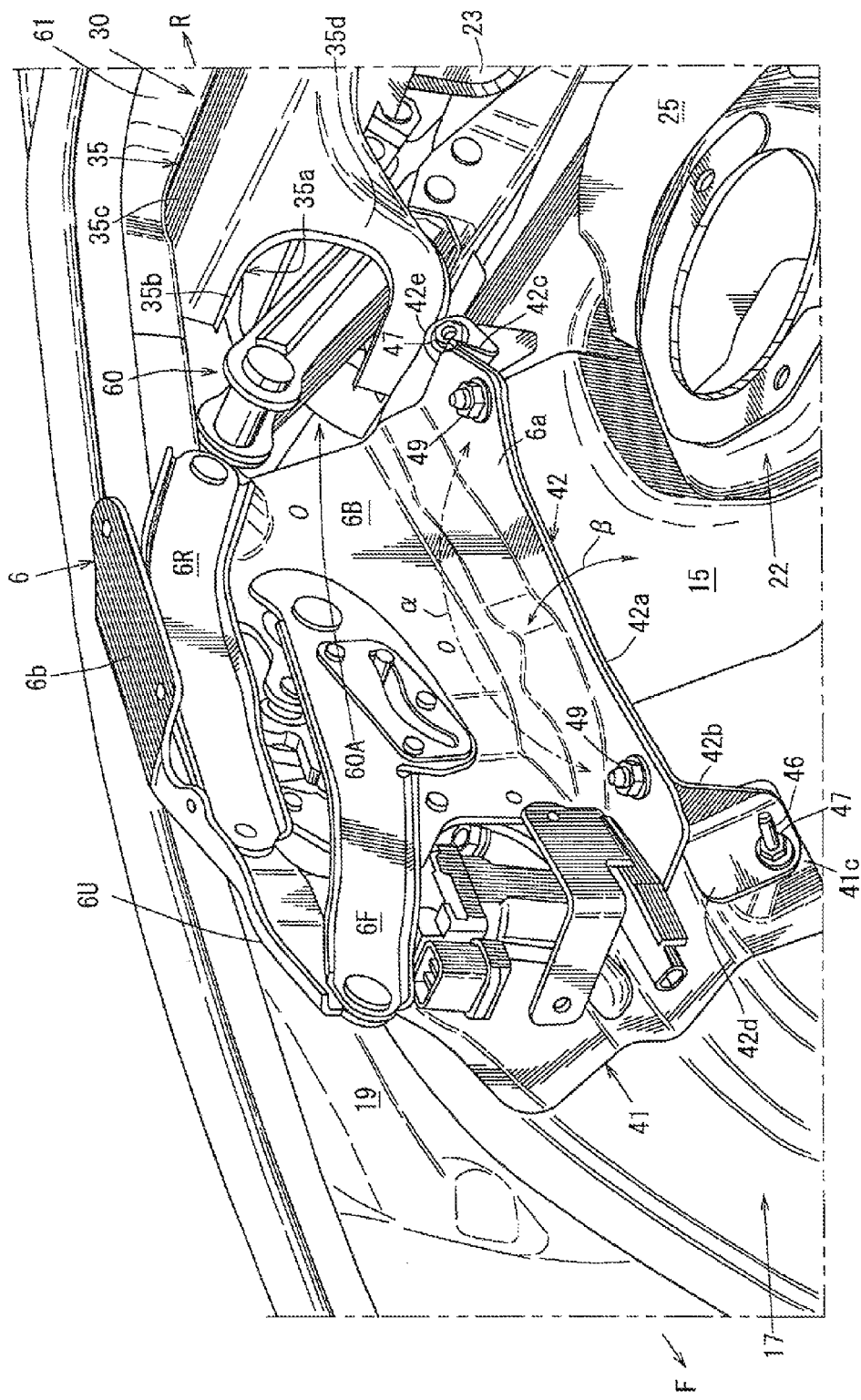
FIG. 8 is a perspective view showing a structure which is formed by the first bracket, a second bracket and a link mechanism.

The link mechanism 6 (c.f. FIGS. 3 and 8) which opens and closes the rear deck cover 3 is formed at each of the left and right ends of the roof storage chamber 2. The link mechanism 6 is connected to the bottom portion of the rear deck cover 3 and the side portion of the roof storage chamber 2. The link mechanism 6 supports a front portion of the bulging portion 3B.

The following is a description about an operation of the link mechanism 6 when the roof 1 in the roof closed state (c.f. FIG. 1) is folded and stored in the roof storage chamber 2. The link mechanism 6 (c.f. FIG. 3) lifts up the rear deck cover 3. When the rear deck cover 3 is lifted up, the roof link mechanism (not shown) folds the front roof 1A, the middle roof 1B and the rear window 9 in the vertical direction to store these members in the roof storage chamber 2 (c.f. FIG. 3). The lift mechanism 6 then lifts down the rear deck cover 3. Accordingly, the roof 1 is stored in the roof storage chamber 2 (c.f. FIG. 4). When the roof 1 is stored in the roof storage chamber 2, the rear deck cover 3 is situated above the roof 1 to cover the roof storage chamber 2 from above.

As shown in the plan view of FIG. 2, the lower end of the bulging portion 3B of the rear deck cover 3 includes a rear portion having a contour so that the lower end is tapered rearward. In other words, the front portion of the lower end of each of the left and right bulging portions 3B, 3B is wide in the vehicle width direction. The rear portion of the lower end of each of the left and right bulging portions 3B, 3B is narrow in the vehicle width direction. The lower end of each of the left and right bulging portions 3B, 3B extends substantially linearly in the vehicle front-rear direction in plan view.

Figure 5:
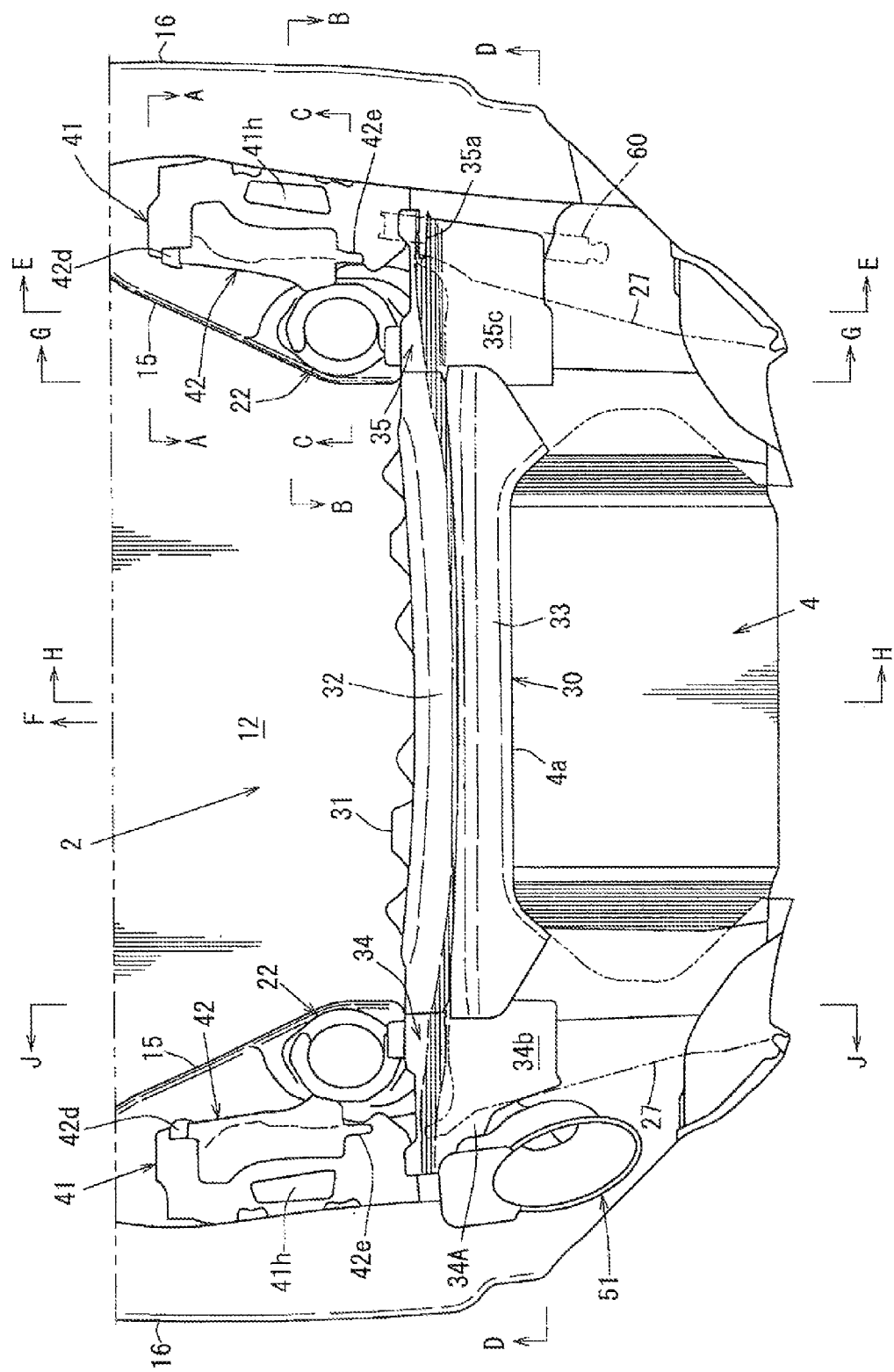
FIG. 5 is a plan view of a vehicle body rear portion.
Figure 6:
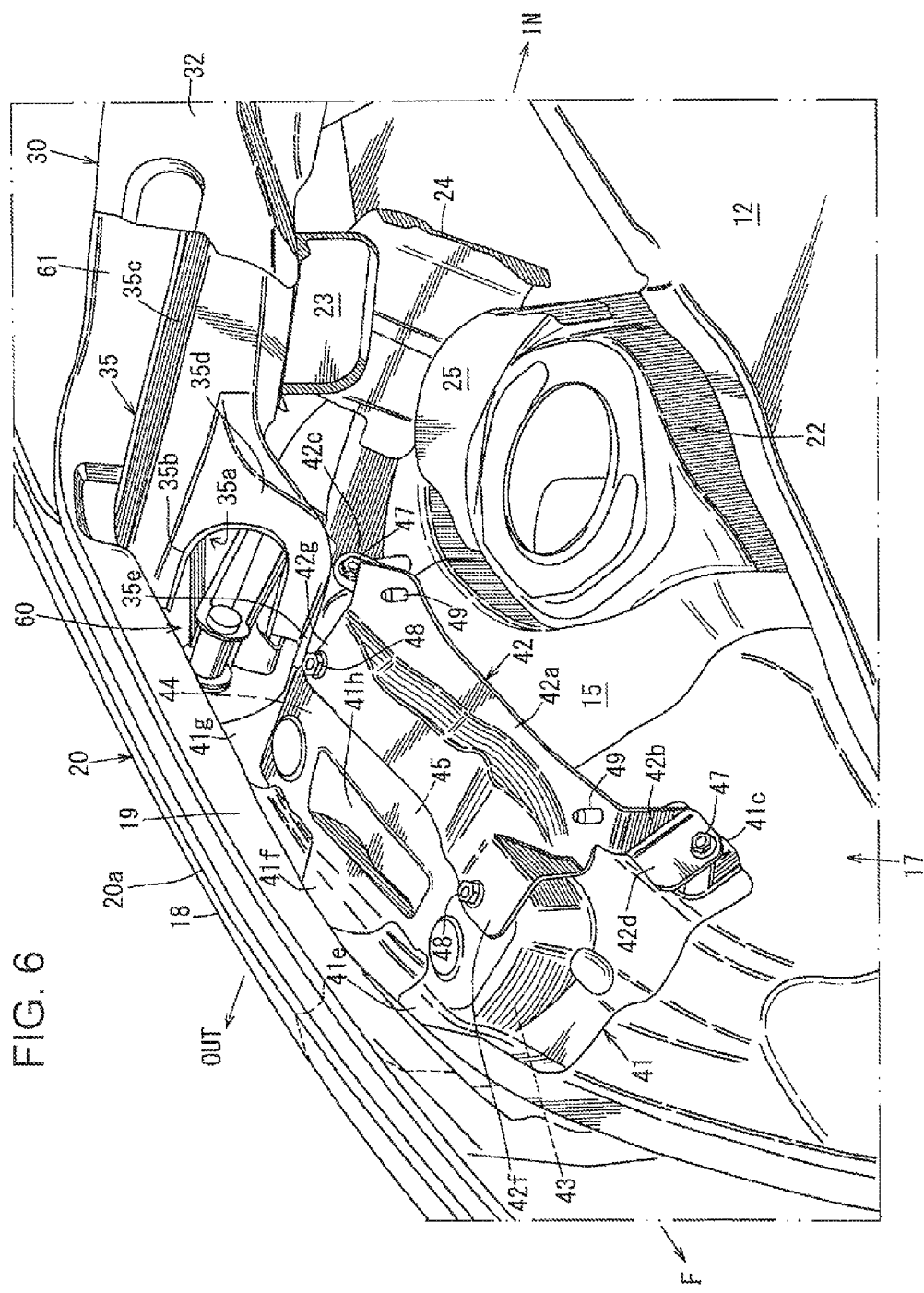
FIG. 6 is a perspective view showing main parts of the vehicle body rear portion depicted in FIG. 5.
Figure 7:
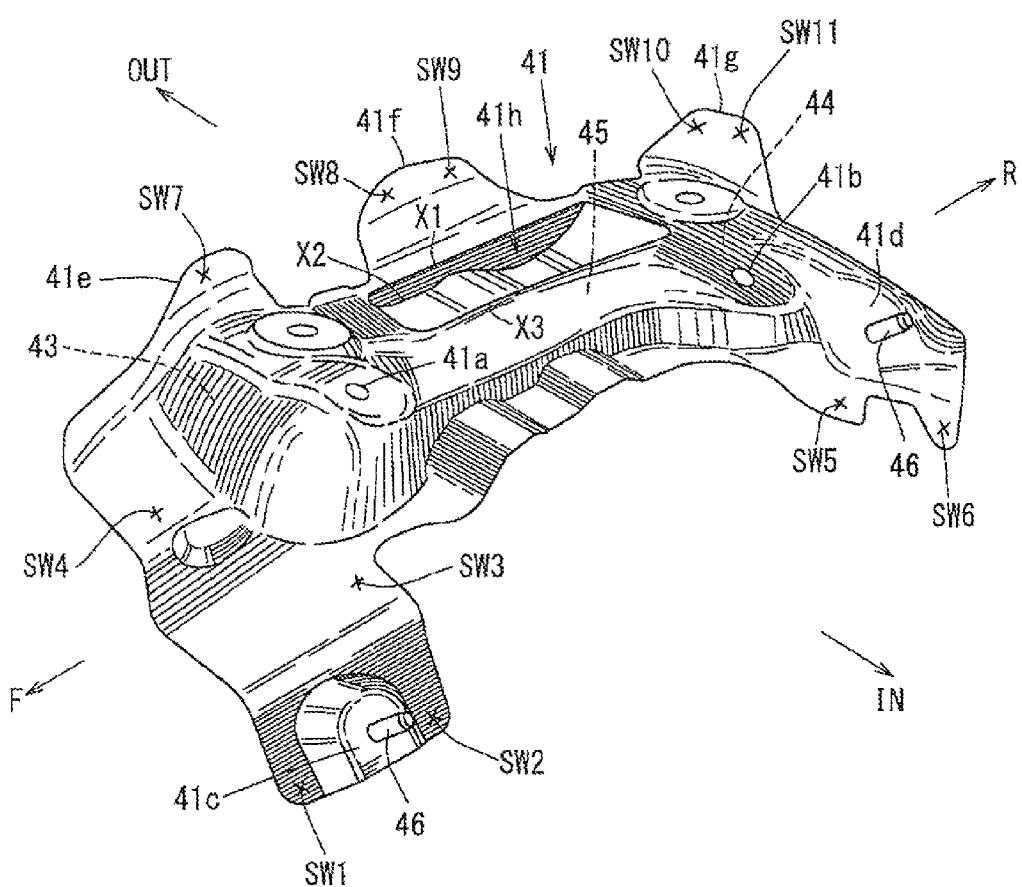
FIG. 7 is a perspective view of a first bracket of the vehicle body rear portion.
Figure 9:
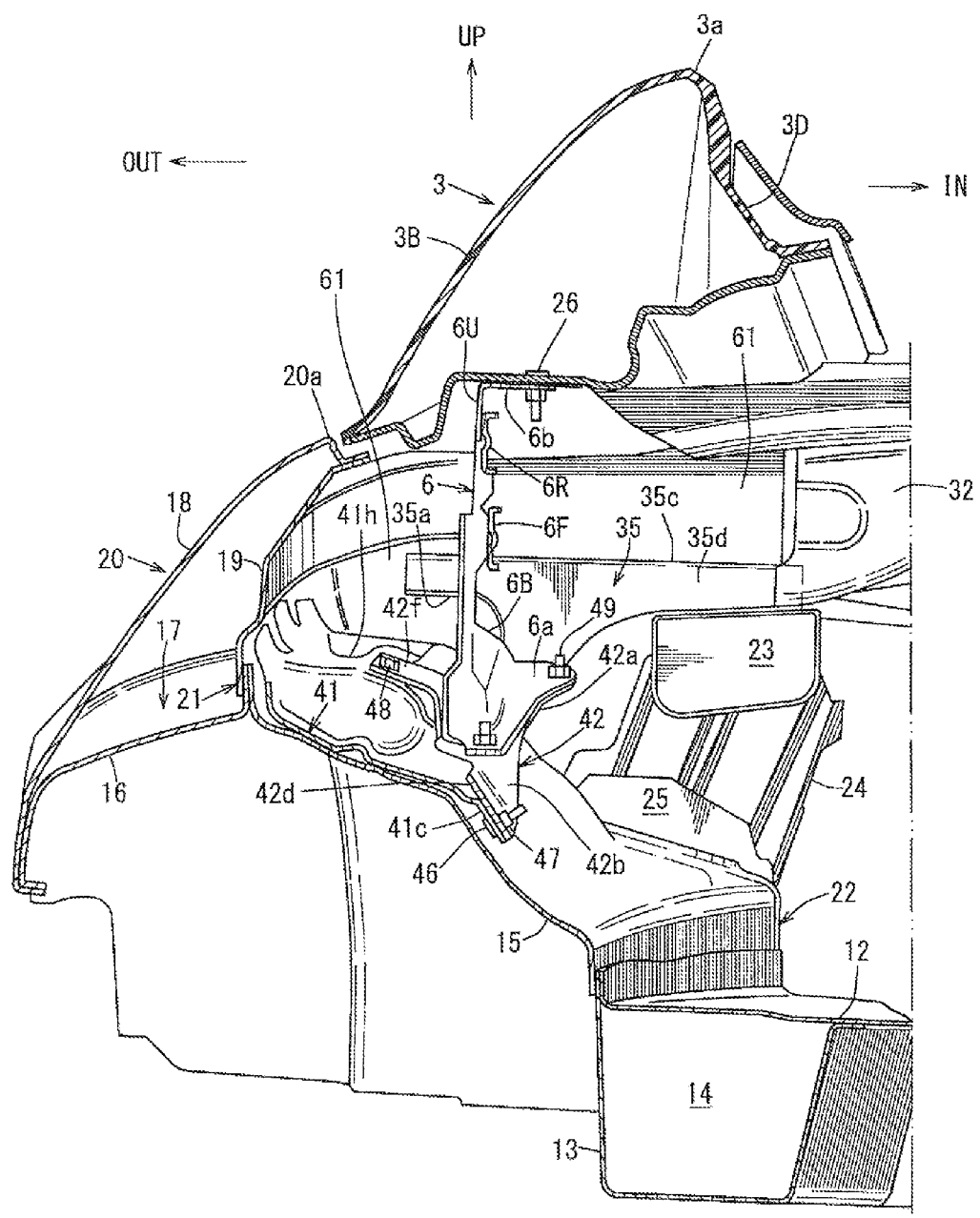
FIG. 9 is a cross-sectional view taken along the line A-A in FIG. 5.
Figure 10:
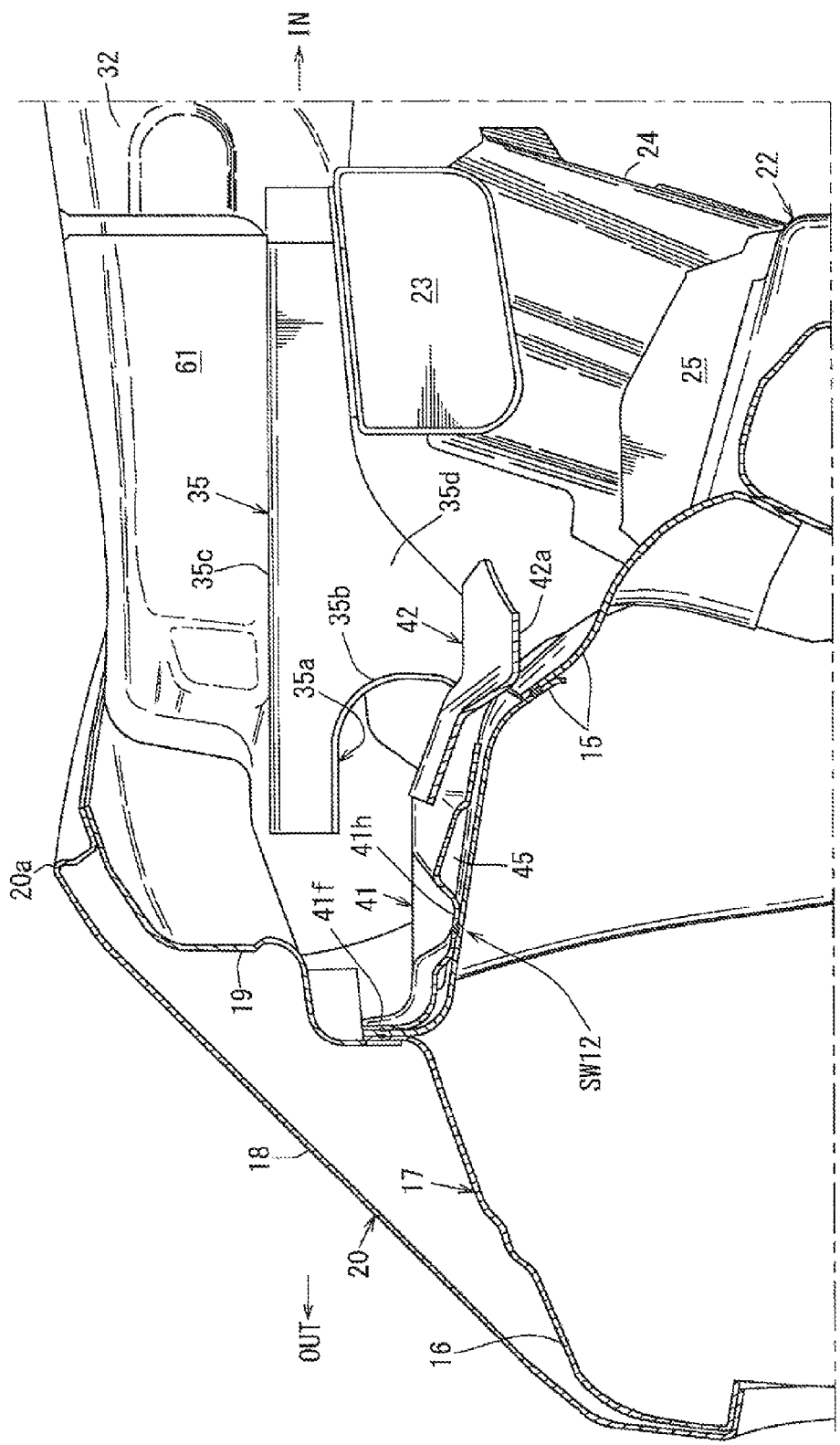
FIG. 10 is a cross-sectional view taken along the line B-B in FIG. 5.
Figure 11:
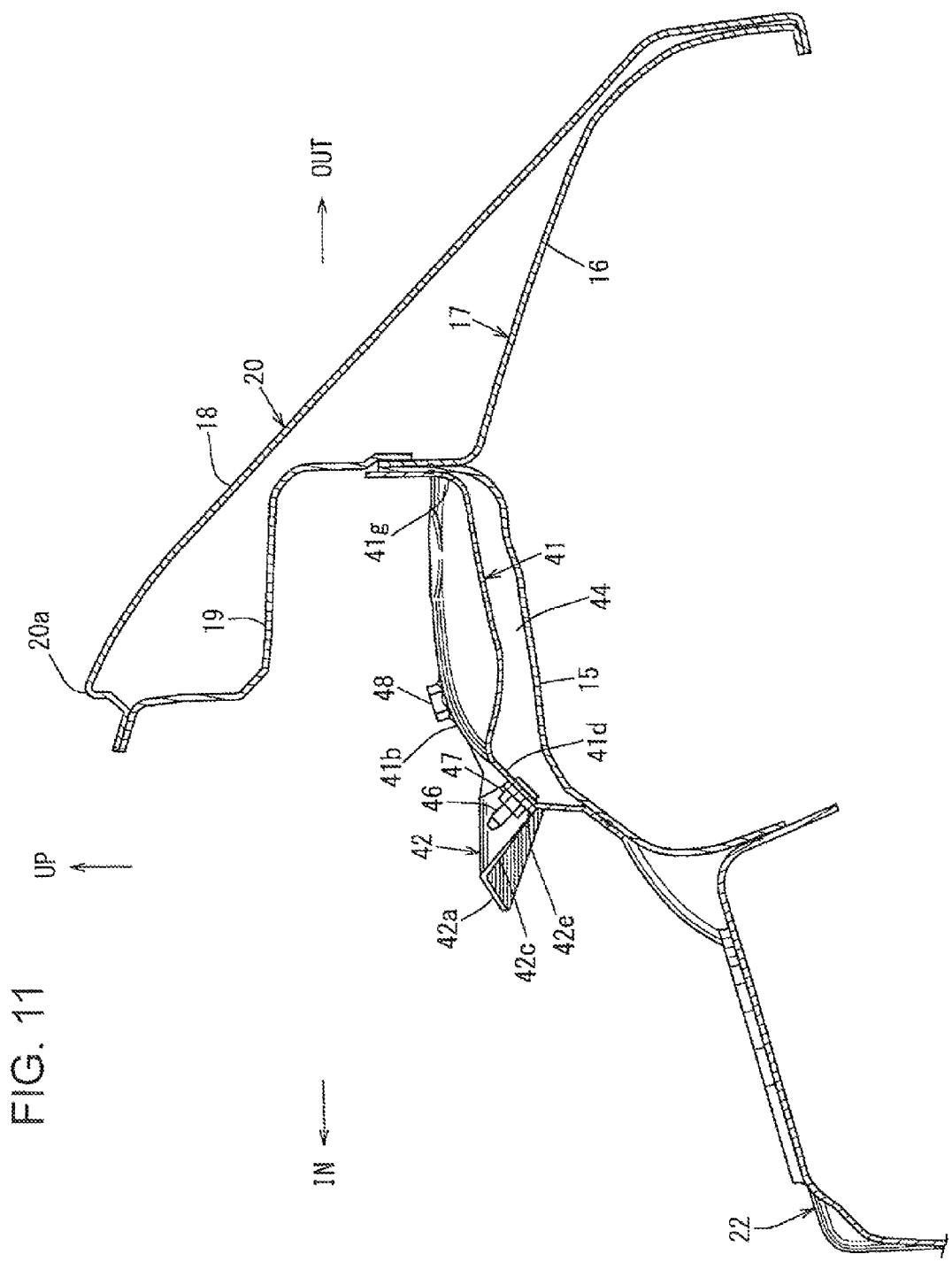
FIG. 11 is a cross-sectional view taken along the line C-C in FIG. 5.
Figure 12:
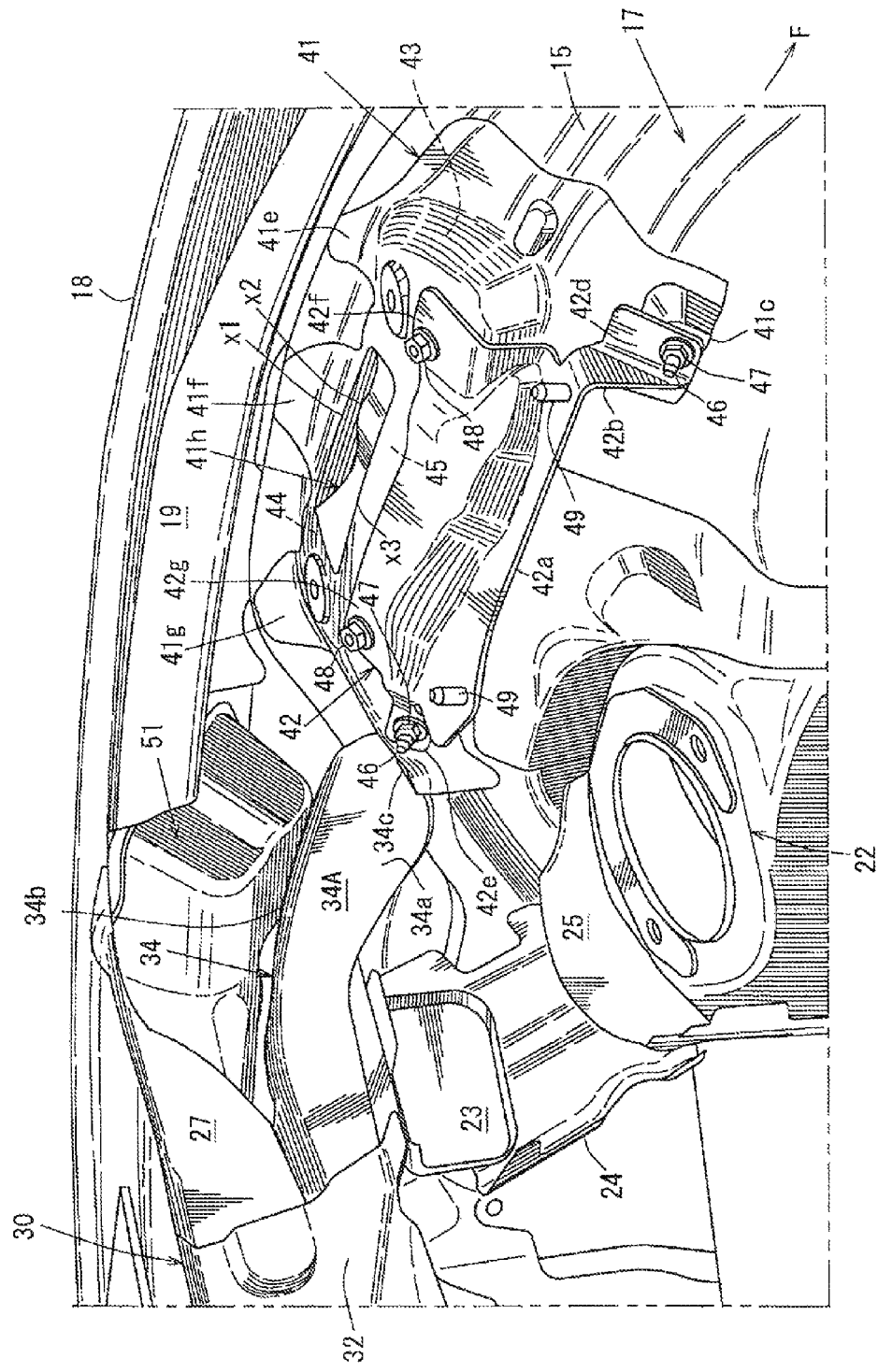
FIG. 12 is a diagram showing a structure around a cup portion of a fuel supply port of an upper rear member.

FIG. 5 is a plan view of the vehicle body rear portion. The roof 1, the rear deck cover 3 and the link mechanism 6 are removed from the vehicle body rear portion shown in FIG. 5. FIG. 6 is a perspective view showing main parts of the vehicle body rear portion depicted in FIG. 5. FIG. 7 is a perspective view of a first bracket of the vehicle body rear portion. FIG. 8 is a perspective view showing a structure formed by the first bracket, a second bracket and the link mechanism 6. FIG. 9 is a cross-sectional view taken along the line A-A in FIG. 5. FIG. 10 is a cross-sectional view taken along the line B-B in FIG. 5. FIG. 11 is a cross-sectional view taken along the line C-C in FIG. 5. FIG. 12 is a perspective view of the vehicle body left portion. FIG. 12 is a diagram showing a structure around a fuel supply port including a cup portion of an upper rear member 15.

FIG. 9 shows a rear floor panel 12, which forms the roof storage chamber 2 and a floor surface of the trunk room 4, and a rear side frame 13 extending in the vehicle front-rear direction. The rear side frame 13 is situated below the rear floor panel 12. The rear side frame 13 is joined to the outer side surface of the rear floor panel 12. A closed section 14 is formed between the rear side frame 13 and the rear floor panel 12. The closed section 14 extends in the vehicle front-rear direction. The rigidity of the vehicle body lower portion is increased by the rear side frame 13 and the rear floor panel 12 forming the closed section 14. In the following description, the term "closed section" means a space formed by a cross-section consecutive in a direction, the cross-section being entirely surrounded by a panel and other plate members.

As shown in FIG. 9, a first inner member 15 and a first outer member 16 are situated outside the rear floor panel 12. The first inner member 15 is joined to the first outer member 16 to form a wheelhouse 17. The rear deck cover 3 is supported above the wheelhouse 17, the rear deck cover 3 being opened and closed. A rear fender 20 is jointed to the outer surface of the first outer member 16. The rear fender 20 includes a second outer member 18 (vehicle body outer plate) and a second inner member 19.

As shown in FIG. 9, the lower end of the second inner member 19 is overlapped with the upper ends of the first inner member 15 and the first outer member 16. The lower end of the second inner member 19 and the upper ends of the first inner member 15 and the first outer member 16 are joined to each other to form a joint portion 21. An upper perimeter 20a of the rear fender 20 is situated on the inner side than the joint portion 21 in the vehicle width direction above the wheelhouse 17. The rigidity of the vehicle body rear portion is increased by the aforementioned positional relationship between the joint portion 21 and the upper perimeter 20a of the rear fender 20. The reference sign 61 used in the drawings indicates a brace side panel which connects the second inner member 19 extending in the vehicle front-rear direction to an end portion of the upper rear member 30 extending in the vehicle width direction. The upper perimeter 20a of the rear fender 20 is connected to the brace side panel 61.

As shown in FIG. 5, an upper rear member 30 is situated between the roof storage chamber 21 on the front side and the trunk room 4 on the rear side. The upper rear member 30 extends in the vehicle width direction to connect between the left and right vehicle body wall portions. The upper rear member 30 is formed by a plurality of members. The upper rear member 30 includes a lower panel 31, a front panel 32 and a rear panel 33. The lower panel 31, the front panel 32 and the rear panel 33 are situated in the middle in the vehicle width direction. The upper rear member 30 further includes side panels 34, 35. The side panels 34, 35 respectively form the left and right portions of the upper rear member 30. In the embodiment, the deck member is exemplified by the upper rear member 30.

FIGS. 6 and 12 show left and right damper support portions 22 which respectively support left and right dampers. The damper support portion 22 bulging in the form of a stump is integrally formed with the first inner member 15. The damper support portion 22 is formed on the inner side in the vehicle width direction and at a rear portion of the first inner member 15.

Figure 13:
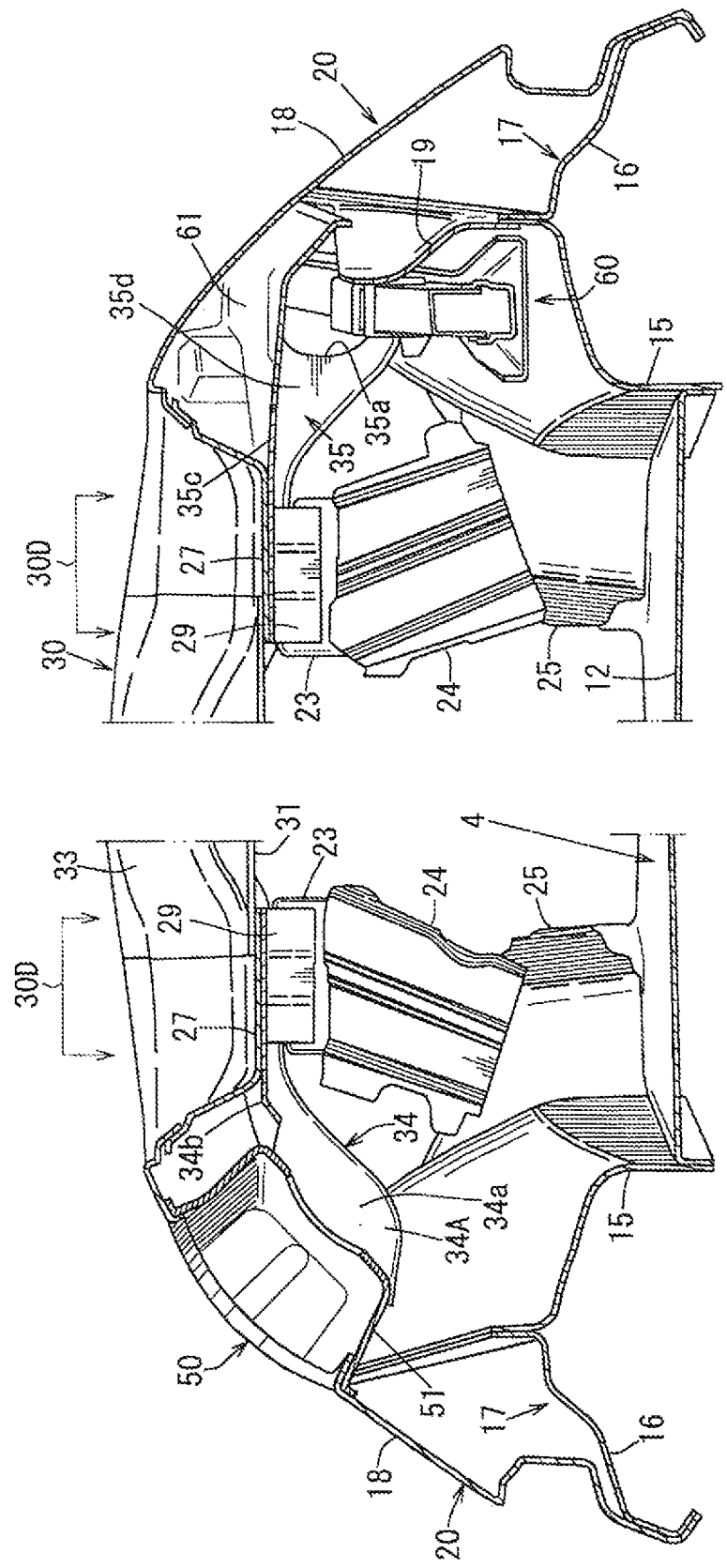
FIG. 13 is a cross-sectional view taken along the line D-D in FIG. 5.

The side panels 34, 35 of the upper rear member 30 are respectively connected to the rear surfaces of the left and right damper support portions 22, 22 by an upper mounting bracket 33 with high rigidity, a diagonal bracket 24 with high rigidity, a lower mounting bracket 25 with high rigidity, and a rear mounting bracket 29 with high rigidity (c.f. FIGS. 13 to 15). The side panels 34, 35 of the upper rear member 30 are supported above the left and right damper support portions 22, 22.

As shown in FIGS. 6, 8 and 9, the link mechanism 6 which opens and closes the rear deck cover 3 is mounted on the first inner member 15 via the first and second brackets 41, 42. The link mechanism 6 and the first and second brackets 41, 42 are situated substantially laterally symmetrical to each other. Therefore, the structure of the vehicle body right portion is described in the following. The description about the structure of the vehicle body right portion is also applicable to the structure of the vehicle body left portion. In the embodiment, the bracket portion is exemplified by the first and second brackets 41, 42.

As shown in FIG. 8, the link mechanism 6 is formed with a parallel link. The parallel link corresponds to a lower link. The parallel link is provided with a base portion 6B including a substantially horizontal mounting seat 6a at a lower portion of the base portion 6B, a front link 6F, a rear link 6R and an upper link 6U including a substantially horizontal rear deck cover mounting portion 6b at an upper end of the upper link 6U. As shown in FIG. 9, the rear deck cover 3 is mounted on the rear deck cover mounting portion 6b with a mounting member 26 such as a bolt and a nut.

The upper portion of the base portion 6B, the front link 6F, the rear link 6R and the upper link 6U are connected by pins to form a parallel link structure. The link mechanism 6 is provided with an actuator (not shown) for driving the link mechanism 6.

As shown in FIGS. 6 and 7, the first bracket 41 includes front and rear outer mounting portions 41a, 41b, which are mounted on the top portion of the first inner member 15. Front and rear closed sections 43, 44 are respectively formed between the front outer mounting portion 41a and the first inner member 15 and between the rear outer mounting portion 41b and the first inner member 15. A connection closed section portion 45 connects the front and rear closed sections 43, 44 in the vehicle front-rear direction.

As shown in FIG. 7, front and rear inner mounting portions 41c, 41d are integrally formed on the inner side of the first bracket 41. Flange portions 41e, 41f, 41g are integrally formed on the outer end of the first bracket 41. The flange portions 41e, 41f, 41g are jointed to the upper end flange portion of the first inner member 15 on the outer side than the front and rear outer mounting portions 41a, 41b. The flange portions 41e, 41f, 41g are distant from each other in the vehicle front-rear direction. The front and rear inner mounting portions 41c, 41d are joined to the wheelhouse 17 on the inner side than the flange portions 41e, 41f, 41g in the vehicle width direction. In the embodiment, the inner joint portion is exemplified by the front and rear inner mounting portions 41c, 41d. The outer joint portion is exemplified by the flange portions 41e, 41f, 41g.

As shown by the X marks in FIG. 7, the first bracket 41 is welded to a corresponding portion of the first inner member 15 at spot welding positions SW1 to SW11. As shown in FIG. 10, three plate members i.e. the first outer member 16, the first inner member 15 and the flange portion 41f are welded at the spot welding positions SW8, SW9 of the flange portion 41f of the first bracket 41.

The flange portion 41f of the first bracket 41 is an outer joint portion in the vehicle width direction. As shown in FIG. 7, a recess 41h extending in the vehicle front-rear direction is formed between the connection closed section portion 45 and the flange portion 41f. As a result of formation of the recess 41h, ridges X1, X2, X3 are formed to extend in the vehicle front-rear direction. FIG. 7 shows the three ridges X1, X2, X3. However, four ridges are actually formed. The ridges X1, X2, X3 contribute to providing high rigidity for the first bracket 41.

As shown in FIG. 10, the recess 41h of the first bracket 41 is connected to the upper surface of the first inner member 15 at two or more spot welding positions SW12 (in FIG. 10, only one spot welding position SW12 is shown). The front and rear closed sections 43, 44 are connected to the connection closed section portion 45 in the vehicle front-rear direction. Therefore, a load input from the rear deck cover 3 is distributed in the vehicle front-rear direction. Consequently, the first bracket 41 may have high rigidity.

Formation of the recess 41h contributes to an increase in the number of ridges (the ridges X1, X2, X3 shown in FIG. 7). As the number of ridges increases, the rigidity of the first bracket 41 increases. The recess 41h is connected to the upper surface of the first inner member 15 (c.f. FIG. 10). Therefore, a load input from the rear deck cover 3 is also distributed to the wheelhouse 17.

The connection closed section portion 45 is formed between the front and rear outer mounting portions 41a, 41b of the first bracket 41. The connection closed section portion 45 is wide in the vehicle width direction. As a result of formation of the connection closed section portion 45, there is an increase in rigidity of the first bracket 41 in the vehicle width direction.

As shown in FIGS. 6, 8, 9 and 11, the second bracket 42 connected to the first bracket 41 is thicker and more rigid than the first bracket 41. The second bracket 42 includes a substantially horizontal mounting seat 42a, lower mounting portions 42d, 42e, and front and rear outer mounting portions 42f, 42g. The mounting seat 42a is situated on the inner side than the top portion of the first inner member 15. The mounting seat 42a supports the link mechanism 6. The lower mounting portions 42d, 42e are formed via leg portions 42b, 42c respectively extending downward from the front and rear ends of the mounting seat 42a. The lower mounting portions 42d, 42e have a slant structure. The outer portions of the lower mounting portions 42d, 42e are situated at a higher position than the inner portions of the lower mounting portions 42d, 42e. The front and rear outer mounting portions 42f, 42g are situated on the outer side than the mounting seat 42a in the vehicle width direction.

As shown in FIGS. 9 and 11, the lower mounting portions 42d, 42e are obliquely fastened to the inner mounting portions 41c, 41d of the first bracket 41 with use of a mounting member such as a welding bolt 46 and a nut 47.

As shown in FIGS. 9 and 11, the lower mounting portions 42d, 42e of the second bracket 42 are obliquely mounted so that an acute angle is defined with respect to a vertical line (an imaginary vertical line extending in the vertical direction).

As shown in FIGS. 6, 9 and 11, the outer mounting portions 42f, 42g of the second bracket 42 are obliquely connected to the outer mounting portions 41a, 41b of the first bracket 41 (c.f. FIG. 7) with use of a mounting member 48 such as a bolt and a nut.

As shown in FIG. 9, the outer mounting portions 42f, 42g of the second bracket 42 are obliquely mounted so that an acute angle is defined with respect to an imaginary horizontal line extending in the vehicle width direction.

If the roof 1 is stored or expanded during driving of the vehicle (i.e. if the rear deck cover 3 is lifted up or down), the mounting seat 6a of the link mechanism 6 receives a force resulting from acceleration or deceleration of the vehicle or vibrations from a bumpy road surface. A load in the vehicle front-rear direction (c.f. the arrow α in FIG. 8) acts on the mounting seat 6a. Since the mounting seat 6a bulges inward of the first inner member 15, the mounting seat 6a receives a vibrational load (c.f. the arrow β in FIG. 8) in the vehicle width direction and in the vertical direction. The load in the vertical direction input from the rear deck cover 3 is obliquely received by the lower mounting portions 42d, 42e of the second bracket 42. Consequently, there is an increase in a ratio of load in a shear direction to a load in the vertical direction. This means a reduction in load in a direction in which a joint portion (c.f. the aforementioned spot welding positions) is peeled off between the first inner member 15 and the first bracket 41. In short, the first bracket 41 is less likely to be peeled off from the first inner member 15. Therefore, the structure for supporting the deck cover becomes very rigid.

The outer mounting portions 42f, 42g of the second bracket 42 obliquely receive a load in the vehicle width direction. Consequently, there is an increase in a ratio of load in a shear direction to a load in the vehicle width direction.

This means a reduction in load in a direction in which a joint portion (c.f. the aforementioned spot welding positions) is peeled off between the first inner member 15 and the first bracket 41. Accordingly, the first bracket 41 is less likely to be peeled off from the first inner member 15. Therefore, the structure for supporting the deck cover becomes very rigid.

As shown in FIGS. 6 and 8, the mounting seat 6a of the base portion 6B of the link mechanism 6 is fastened to the mounting seat 42a of the second bracket 42 with use of a mounting member 49 such as a bolt and a nut.

As shown in FIGS. 9 and 11, the outer mounting portions 41a, 41b of the first bracket 41 and the outer mounting portions 42f, 42g of the second bracket 42 are situated on the extension of the inner mounting portions 41c, 41d of the first bracket 41. Accordingly, the load is transmitted along the plane direction of the first inner member 15. Therefore, the first inner member 15 is less likely to be moved down by the load input from the rear deck cover 3.

The damper support portion 22 serves as a load input point at which the load transmitted from a suspension is input during driving of the vehicle. As shown in FIGS. 10 and 11, the support portion (c.f. the mounting portions 42d, 42e, 42f, 42g) of the second bracket 42 is situated on the extension of the inner side surface of the first inner member 15 extending from the damper support portion 22. The support portion (c.f. the mounting portions 42d, 42e, 42f, 42g) of the second bracket 42 is inclined with respect to the horizontal direction. Accordingly, there is a decrease in peeling load applied to the first and second brackets 41, 42. The support portion (c.f. the mounting portions 42d, 42e, 42f, 42g) of the second bracket 42 receives a large load as a shear load. Therefore, the structure described in the context of the embodiment is advantageous in securing high joint strength.

As shown in FIGS. 1 to 4, a fuel supply port 50 is formed in the second outer member 18 forming the vehicle body left portion. As shown in FIGS. 5 and 12, the fuel supply port 50 includes a cup portion 51. The cup portion 51 projects inward in the vehicle width direction from the rear fender 20.

As shown in FIG. 12, a downward bent portion 34A is formed on the side of the vehicle body side portion where the fuel supply port 50 and the cup portion 51 are formed (i.e. on the vehicle body left portion). The left side panel 34 constitutes an end portion of the upper rear member 30. The downward bent portion 34A is formed on the left side panel 34. The downward bent portion 34A is bent downward so as to avoid the cup portion 51. In the embodiment, the first end portion is exemplified by the left side panel 34.

The right side panel 35 constitutes an end portion of the upper rear member 30 opposite to a side of the vehicle body side portion (i.e. the vehicle body left portion) where the downward bent portion 34A is formed. As shown in FIGS. 6, 8 and 10, an opening portion 35a is formed in the right side panel 35. The opening portion 35a allows insertion of a jack 60 from the trunk room 4 into a cabin. A flange portion 35b is integrally formed with the perimeter of the opening portion 35a. The flange portion 35b projects forward. In the embodiment, the auxiliary device is exemplified by the jack 60.

FIG. 13 is a cross-sectional view taken along the line D-D in FIG. 5. As shown in FIGS. 12 and 13, the downward bent portion 34A of the side panel 34 overlaps the fuel supply port 50 and the cup portion 51 in the side view of the vehicle. The downward bent portion 34A includes a front wall 34a and an upper wall 34b. The upper wall 34b is situated on the inner side than the fuel supply port 50 in the vehicle width direction. The upper wall 34b extends in the vehicle front-rear direction. The front wall 34a and the upper wall 34b form a substantially L-shaped lateral cross-section. A joint tongue piece 34c is integrally formed with the front wall 34a. The joint tongue piece 34c extends forward from the lower portion of the front wall 34a. Three plate members i.e. the joint tongue piece 34c, the first bracket 41 and the first inner member 15 are welded to each other.

As shown in FIGS. 12 and 13, the downward bent portion 34A of the left side panel 34 of the upper rear member 30 overlaps the fuel supply port 50 in the side view of the vehicle. Consequently, there is an increase in the degree of freedom about a layout of the fuel supply port 50. Since the fuel supply port 50 overlaps the downward bent portion 34A, it is less likely that a fuel feed pipe interferes with a space for the trunk room 4. Therefore, the trunk room 4 may have a large space.

The downward bent portion 34A includes the front wall 34a and the upper wall 34b as described above. The front wall 34a and the upper wall 34b form the substantially L-shaped lateral cross-section as described above. Consequently, there is high rigidity for both of the vehicle body and a portion of the vehicle body side portion where the fuel supply port is formed. The upper wall 34b of the downward bent portion 34A is joined to an upper panel 27. In the embodiment, the first upper wall is exemplified by the upper wall 34b.

The upper rear member 30 is situated at a position where the upper rear member 30 overlaps the fuel supply port 50. Consequently, there is a large space for installing an auxiliary device (in the embodiment, a space for installing the roof 1) on the front side of the upper rear member 30. Even if the vehicle has a vehicle body rear portion having a short size in the vehicle front-rear direction, a large space for installing an auxiliary device and a large trunk room space are secured by the design principle described in the context of the embodiment. In addition, the design principle described in the context of the embodiment contributes to securing high rigidity for the vehicle body.

The right side panel 35 is situated on the side of the vehicle body side portion opposite to the side (the vehicle body left portion) where the downward bent portion 34A is formed. As shown in FIGS. 6 and 13, the right side panel 35 includes an upper wall 35c and an L-shaped lower wall 35d. The opening portion 35a is formed in the side panel 35 between the upper and lower walls 35c, 35d. The jack 60 is an elongated member which is used as an auxiliary device. As shown in FIG. 13, the opening portion 35a allows insertion of the jack 60 from the trunk room 4 into the cabin. In the embodiment, the second end portion and the upper rear member side portion are exemplified by the right side panel 35. The second upper wall is exemplified by the upper wall 35c.

As shown in FIG. 6, the joint tongue piece 35e is integrally formed with the lower portion of the L-shaped lower wall 35d. The joint tongue piece 35e extends forward from the lower portion of the lower wall 35d. Three plate members i.e. the joint tongue piece 35e, the first bracket 41 and the first inner member 15 are welded to each other.

As shown in FIGS. 6 and 13, the downward bent portion 34A is formed on one end (in the embodiment, on the left end) of the upper rear member 30 extending in the vehicle width direction. The side panel 35 is situated on the other end (in the embodiment, on the right end) of the upper rear member 30 extending in the vehicle width direction. Consequently, an excessively large difference in rigidity is less likely to occur between the vehicle body left portion and the vehicle body right portion. The positional relationship between the downward bent portion 34A and the side panel 35 contributes to securing a large space for storing an auxiliary device (e.g. the jack 60). The auxiliary device is inserted from the trunk room 4 into the cabin through the opening portion 35a. The upper wall 35c of the side panel 35 is joined to the upper panel 27.

An auxiliary device storage portion 60A stores the jack 60, which is used as an auxiliary device in an end portion of the vehicle body side portion opposite to the side where the upper rear member 30 is formed (i.e. in an end portion of the vehicle body right portion). As shown in FIG. 8, the auxiliary device storage portion 60A is situated behind a link mechanism which opens and closes the roof 1 or the rear deck cover 3 (in the embodiment, the link mechanism 6 which opens and closes the rear deck cover 3).

As shown in FIG. 8, the auxiliary device storage portion 60A is situated behind the link mechanism 6 which opens and closes the rear deck cover 3. A dead space is effectively used for storing the jack 60, which is used as the auxiliary device. The front portion of the upper rear member 30 is used as the roof storage chamber 2 of the open car. The passenger room 7 (i.e. the vehicle chamber) is situated in front of the roof storage chamber 2. Accordingly, it is less likely that the jack 60 used as the auxiliary device drops into the vehicle chamber when the vehicle is collided from behind.

Figure 14A:
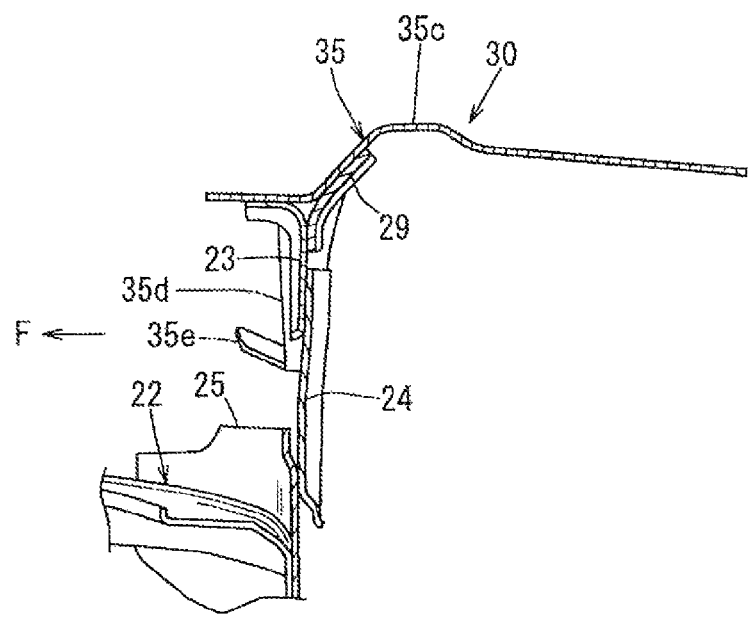
FIG. 14A is a cross-sectional view taken along the line E-E in FIG. 5.
Figure 14B:
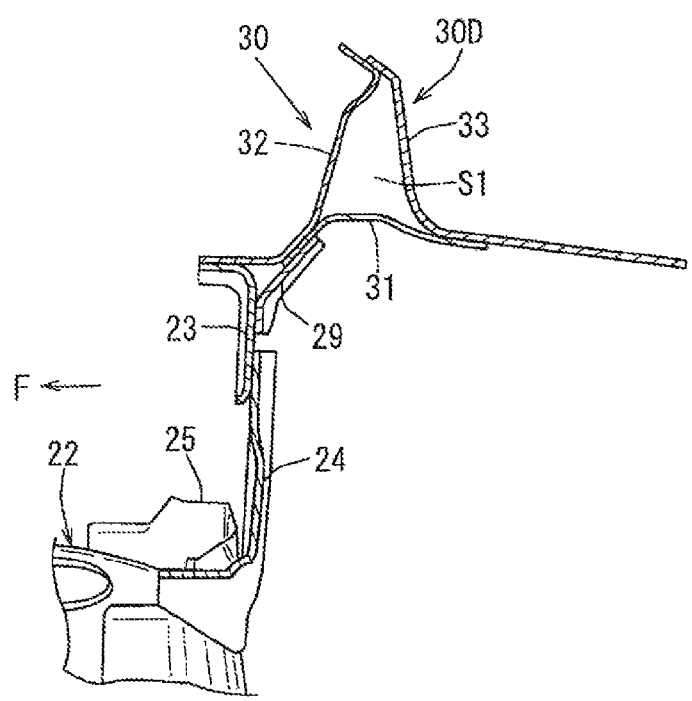
FIG. 14B is a cross-sectional view taken along the line G-G in FIG. 5.
Figure 15A:
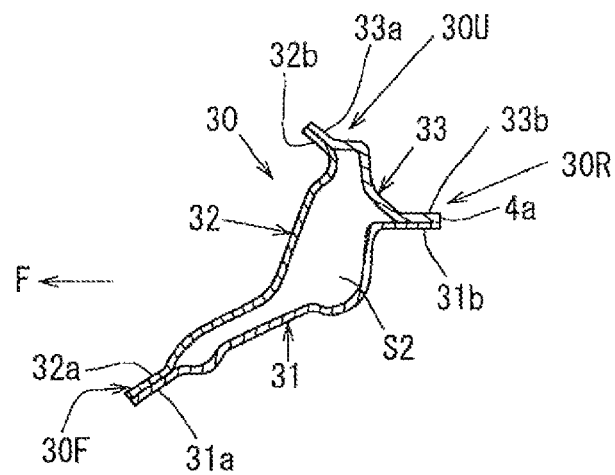
FIG. 15A is a cross-sectional view taken along the line H-H in FIG. 5.
Figure 15B:
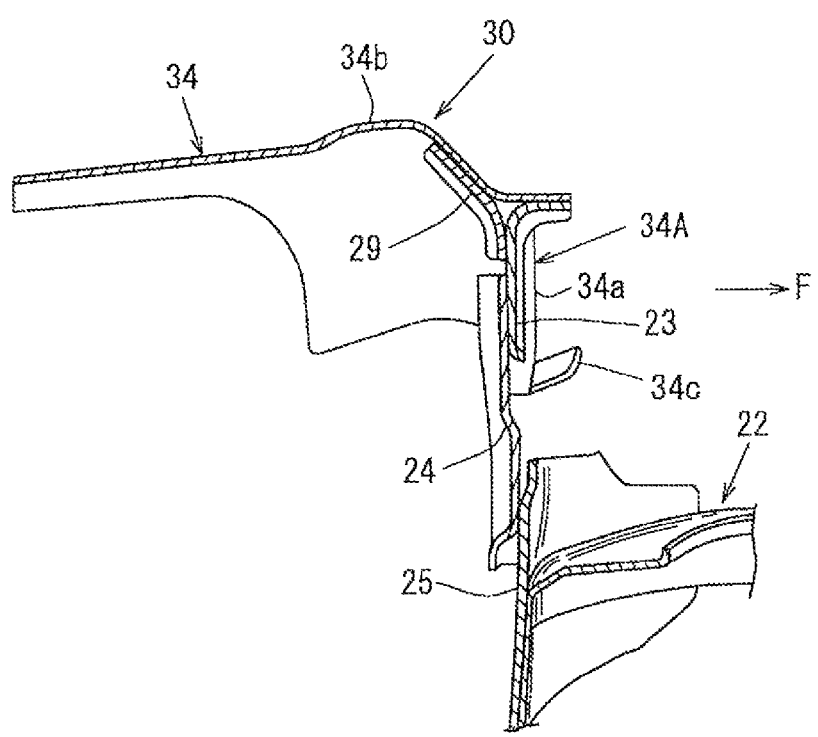
FIG. 15B is a cross-sectional view taken along the line J-J in FIG. 5.

FIG. 14A is a cross-sectional view taken along the line E-E in FIG. 5. FIG. 14B is a cross-sectional view taken along the line G-G in FIG. 5. FIG. 15A is a cross-sectional view taken along the line H-H in FIG. 5. FIG. 15B is a cross-sectional view taken along the line J-J in FIG. 5.

As shown in FIG. 13 (a rear view: a cross-sectional view taken along the line D-D in FIG. 5), the upper rear member 30 includes connecting portions 30D, 30D. One of the connecting portions 30D, 30D is formed on the left portion of the upper rear member 30. The other of the connecting portions 30D, 30D is formed on the right portion of the upper rear member 30. Each of the connecting portions 30D, 30D is connected to the corresponding one of the damper support portions 22, 22. The width dimension of each of the connecting portions 30D, 30D corresponds to the width of an upper mounting bracket 23 or corresponds to the width of the rear mounting bracket 29 in the vehicle width direction.

As shown in FIGS. 14B and 15A, closed sections S1, S2 are formed on the middle side than the connecting portion 30D of the upper rear member 30 in the vehicle width direction. The closed sections S1, S2 are defined by the lower panel 31, the front panel 32 and the rear panel 33. As shown in FIGS. 14A and 15B, the upper rear member 30 forms an open section on the outer side than the connecting portion 30D in the vehicle width direction. The open section is formed by the side panels 35, 34. The term "open section" means a space consecutive in a direction, the space being incompletely surrounded by a panel and other plate members.

The connecting portions 30D, 30D of the upper rear member 30 are respectively connected to the left and right damper support portions 22, 22. The upper rear member 30 connects the connecting portions 30D, 30D in the vehicle width direction with use of a member, which has high rigidity and forms the closed sections S1, S2. The upper rear member 30 forms an open section on the outer side than the connecting portions 30D, 30D in the vehicle width direction. The rigidity of the upper rear member 30 locally decreases at a portion of the upper rear member 30 where an open section is formed. Stress concentration is less likely to occur on a connecting portion between the upper rear member 30 and a peripheral member of the upper rear member 30. A portion of the upper rear member 30 with high rigidity is connected to the left and right damper support portions 22, 22. The structure of the upper rear member 30 in the embodiment allows for the designer to omit reinforcement for a peripheral member. Therefore, the upper rear member 30 becomes lightweight. Accordingly, the upper rear member 30 may have a reduced thickness with high rigidity. The upper rear member 30 is less likely to cause stress concentration on a peripheral member (i.e. members around the side panels 34, 35). Therefore, the designer may omit reinforcement for a peripheral member.

As shown in FIGS. 5 and 15A, the middle closed section S2 of the upper rear member 30 is formed by the rear panel 33 (a rear surface portion), the lower panel 31 and the front panel 32. The rear panel 33 is formed by a panel, which is connected to an opening perimeter 4a of the trunk room 4. The rear panel 33 is thinner than the lower panel 31 and the front panel 32. In the embodiment, the panel is exemplified by the rear panel 33. Another panel is exemplified by the lower panel 31 and the front panel 32.

The aforementioned structure formed by the rear panel 33, the lower panel 31 and the front panel 32 not only contributes to high rigidity of the upper rear member 30 but also exhibits a function of a panel which is connected to the opening perimeter 4a of the trunk room 4. As a result of the aforementioned structure formed by the rear panel 33, the lower panel 31 and the front panel 32, stress concentration is less likely to occur on the trunk room 4. The aforementioned structure formed by the rear panel 33, the lower panel 31 and the front panel 32 reduces the load and allows transmission of the load. Therefore, the aforementioned structure formed by the rear panel 33, the lower panel 31, and the front panel 32 contributes to securing high rigidity for the vehicle body as a whole.

As is clear from the comparison between FIGS. 14B and 15A, the closed section S1 of the connecting portion 30D which is connected to the damper support portion 22 has a larger cross-sectional area than the middle closed section S2 of the upper rear member 30. The length of the contour forming a cross-sectional contour of the closed section S1 is shorter than the length of the contour forming a cross-sectional contour of the closed section S2. In the embodiment, the connection closed section is exemplified by the closed section S1. The middle closed section is exemplified by the closed section S2.

The closed section S1 formed in each of the connecting portions 30D, 30D is different in cross-sectional shape from the closed section S2 formed between the connecting portions 30D, 30D. The connecting portion 30D of the upper rear member 30 functions as a joint portion. The sectional area of the close space S1 of the connecting portion 30D is larger than the middle closed section S2. Therefore, the upper rear member 30 may appropriately receive stress acting in different directions. A load from the damper is received by the connecting portion 30D. The load from the damper is then smoothly transmitted to the left and right ends of the upper rear member 30. As shown in FIGS. 14A to 15B, the left and right damper support portions 22, 22 are formed on the lower front side of the upper rear member 30.

As shown in FIG. 15A, the lower panel 31 which is used as a part of the upper rear member 30 includes a front flange 31a and a rear flange 31b. The front panel 32 includes a lower flange 32a and an upper flange 32b. The rear panel 33 includes a front flange 33a and a rear flange 33b.

As shown in FIG. 15A, the middle portion of the upper rear member 30 includes a forward downward extension 30F extending forward and downward with respect to the center portion of the closed section S2, an upward extension 30U extending upward with respect to the center portion of the closed section S2, and a rearward extension 30R extending rearward with respect to the center portion of the closed section S2.

As shown in FIG. 15A, the forward downward extension 30F is formed by a joint structure of the flanges 31a, 32a. The upward extension 30U is formed by a joint structure of the flanges 32b, 33a. The rearward extension 30R is formed by a joint structure of the flanges 31b, 33b.

The center of the closed section S2 of the upper rear member 30 is situated behind the left and right damper support portions 22, 22. The closed section S2 of the upper rear member 30 is narrow. Therefore, a large space for installing a member such as an auxiliary device (in the embodiment, the roof 1) is formed between the left and right damper support portions 22, 22, which are formed on the lower front side of the upper rear member 30. The upper rear member 30 may firmly receive a load input from the left and right damper support portions 22, 22 in the extending direction of the forward downward extension 30F. The upward and rearward extensions 30U, 30R reinforce the forward downward extension 30F. The forward downward extension 30F is less like to cause a positional change.

As shown in FIG. 13, the connecting portion 30D of the upper rear member 30 which is connected to the damper support portion 22 is formed as a joint portion among the left and right side panels 34, 35, the middle lower panel 31, the front panel 32 and the rear panel 33. Many panels are used in the connecting portion 30D. The upper rear member 30 may have high resistance against a shear load. Therefore, a load from the damper is appropriately received by the connecting portion 30D. In the drawings, the arrow F indicates the front side of the vehicle. The arrow R indicates the rear side of the vehicle. The arrow IN indicates the inner side in the vehicle width direction. The arrow OUT indicates the outer side in the vehicle width direction. The arrow UP indicates the upper side of the vehicle.

The aforementioned embodiment mainly includes a vehicle body rear portion structure having the following configuration.

A vehicle body rear portion structure for an automobile according to one aspect of the embodiment supports a rear deck cover of an open car so that the rear deck cover opens and closes above a wheelhouse. The vehicle body rear portion structure includes a rear fender including an upper perimeter extending on an inner side in a vehicle width direction above the wheelhouse; a deck member extending in the vehicle width direction; and a support structure which supports the rear deck cover. The upper perimeter is connected to the deck member. The support structure includes a link mechanism, which opens and closes the rear deck cover, and a bracket portion including a mounting seat situated on an inner side with respect to a top portion of the wheelhouse in the vehicle width direction, the bracket portion supporting the link mechanism. The link mechanism is supported on the wheelhouse via the bracket portion.

According to the aforementioned configuration, the link mechanism is supported on the wheelhouse via the bracket portion. Therefore, the vehicle body is provided with high rigidity. Accordingly, the vehicle body rear portion structure is provided with a compact structure for supporting the rear deck cover.

With regard to the aforementioned configuration, the bracket portion may include a first bracket connected to the wheelhouse, and a second bracket connected to the first bracket. The link mechanism may be mounted on the wheelhouse via the first and second brackets. The mounting seat may be situated substantially horizontally in the second bracket. The second bracket may include a lower mounting portion extending downward from the mounting seat, and an outer mounting portion situated on an outer side than the mounting seat in the vehicle width direction. The lower mounting portion may be mounted obliquely to the first bracket in a vertical direction. The outer mounting portion may be connected obliquely to the first bracket in the vehicle width direction.

According to the aforementioned configuration, the lower mounting portion is mounted obliquely to the first bracket in the vertical direction. Therefore, a load input from the rear deck cover in the vertical direction is received obliquely by the lower mounting portion of the second bracket. Accordingly, there is an increase in a ratio of load in a shear direction to load acting in the vertical direction. This means a reduction in load in a direction in which a joint portion is peeled off. Therefore, the first bracket is less likely to be peeled off from the wheelhouse. Consequently, the vehicle body rear portion structure is advantageous in securing high rigidity for a structure which supports a deck cover.

The outer mounting portions may obliquely receive the load acting in the vehicle width direction. Since there is an increase in a ratio of load in a shear direction to load in the vehicle width direction, there is a reduction in load acting in a direction in which a joint portion is peeled off. Therefore, the first bracket is less likely to be peeled off from the wheelhouse. Accordingly, the vehicle body rear portion structure is advantageous in securing high rigidity for a structure for supporting a deck cover. According to the principle of the embodiment, there is an increase in support strength of a link mechanism which opens and closes a rear deck cover without an excessive increase in weight of a vehicle body.

With regard to the aforementioned configuration, the first bracket includes front and rear outer mounting portions, which are mounted on the wheelhouse, and an outer joint portion, which is joined to the wheelhouse on an outer side than the front and rear outer mounting portions in the vehicle width direction. Front and rear closed sections may be formed between the wheelhouse and each of the front and rear outer mounting portions. A connection closed section portion may be formed, the connection closed section connecting the front and rear closed sections in a vehicle front-rear direction. A recess extending in the vehicle front-rear direction may be formed between the connection closed section portion and the outer joint portion. The recess may be connected to an upper surface of the wheelhouse.

According to the aforementioned configuration, the front and rear closed sections are connected in the vehicle front-rear direction by the connection closed section portion. Therefore, the load is distributed in the vehicle front-rear direction. The first bracket may have high rigidity. Since formation of the recess results in an increase in the number of ridges, there is an increase in rigidity of the first bracket itself.

The recess is connected to the upper surface of the wheelhouse. Therefore, the input load is also distributed to the wheelhouse. Since the wide connection closed section portion in the vehicle width direction is formed between the front and rear outer mounting portions, the first bracket may have high rigidity in the vehicle width direction as well as in the vehicle front-rear direction.

With regard to the aforementioned configuration, the first bracket may include an inner joint portion, which is jointed to the wheelhouse on an inner side than the front and rear outer mounting portions in the vehicle width direction. The outer mounting portions of the first and second brackets may be situated on an extension of the inner joint portion.

According to the aforementioned configuration, the front and rear closed sections are situated on the extension of the inner joint portion. Therefore, a load is not transmitted in a direction of pushing down the wheelhouse, but is transmitted along a plane direction of the wheelhouse (a direction along which the plane of the wheelhouse extends).

With regard to the aforementioned configuration, the first bracket may include front and rear outer mounting portions, which are mounted on the wheelhouse, and an inner joint portion, which is jointed to the wheelhouse on an inner side than the front and rear outer mounting portions in the vehicle width direction. The outer mounting portions of the first and second brackets may be situated on an extension of the inner joint portion.

According to the aforementioned configuration, the front and rear closed sections are situated on the extension of the inner joint portion. Therefore, a load is not transmitted in a direction of pushing down the wheelhouse, but is transmitted along a plane direction of the wheelhouse (a direction along which the plane of the wheelhouse extends).

With regard to the aforementioned configuration, a fuel supply port may be formed in a vehicle body side portion. The deck member may include a first end portion, which has a downward bent portion, the downward bent portion being bent downward so as to avoid the fuel supply port. The fuel supply port may overlap the downward bent portion in a side view of the vehicle. The downward bent portion may include a front wall, and a first upper wall extending in the vehicle front-rear direction on an inner side of the fuel supply port in the vehicle width direction. The front wall and the first upper wall may form an L-shaped lateral cross-section of the downward bent portion.

According to the aforementioned configuration, the fuel supply port overlaps the downward bent portion in the side view of the vehicle. Therefore, there is an increase in the degree of freedom about a layout of the fuel supply port. Since the fuel supply port overlaps the downward bent portion, it is less likely that a feed pipe interferes with a space for a trunk room. The trunk room may have a large space. Since the downward bent portion includes the front wall and the upper wall, which form an L-shaped lateral cross-section, the vehicle body may have high rigidity. In addition, a portion of the vehicle body side portion where the fuel supply port is formed may have high rigidity.

According to the aforementioned configuration, since the deck member is situated at a position where the deck member overlaps the fuel supply port, a large space for installing an auxiliary device is formed in front of the deck member. Even when the vehicle has a short vehicle body rear portion, it is possible to form a large space for installing an auxiliary device and a large trunk space. In addition, the vehicle body may have high rigidity.

With regard to the aforementioned configuration, the deck member may include a second end portion opposite to a side, where the downward bent portion is formed, in the vehicle width direction. The second end portion may include an upper rear member side portion provided with a second upper wall and an L-shaped lower wall. The upper rear member side portion may include an opening portion between the second upper wall and the lower wall. The opening portion may allow insertion of an auxiliary device from a trunk room into a cabin.

According to the aforementioned configuration, the downward bent portion is formed on one end of the deck member extending in the vehicle width direction, and the upper rear member side portion is formed on the other end of the deck member. Therefore, there is a reduction in a difference in rigidity between the vehicle body left portion and the vehicle body right portion. In addition, it is possible to secure a sufficiently large space for storing an auxiliary device, which is inserted from the trunk room to the cabin through the opening portion. The principle of the embodiment may reduce a difference in rigidity between the vehicle body left portion and the vehicle body right portion. In addition, the principle of the embodiment contributes to securing a sufficiently large space for storing an auxiliary device.

With regard to the aforementioned configuration, the vehicle body rear portion structure may further include an auxiliary device storage portion in which the auxiliary device is stored. The auxiliary device storage portion may be situated behind the link mechanism.

According to the aforementioned configuration, the auxiliary device storage portion is situated behind the link mechanism which opens and closes the roof or the rear deck cover. Therefore, a dead space is effectively used for storing an auxiliary device. The front portion of the deck member is used as a roof storage portion of the open car. Since the vehicle chamber is situated in front of the roof storage portion, it is less likely that an auxiliary device drops into the vehicle chamber when the vehicle is collided from behind.

With regard to the aforementioned configuration, the deck member may include a connecting portion, which is connected to a damper support portion configured to support a damper. The deck member may form a middle closed section on a middle side than the connecting portion in the vehicle width direction, and an open section on an outer side than the connecting portion.

According to the aforementioned configuration, the damper support portion is connected by a member forming the middle closed section. Since the deck member forms the open section on the outer side than the connecting portion in the vehicle width direction, there is a local reduction in rigidity of the deck member. It is less likely to cause stress concentration on a connecting portion between the deck member and a member around the deck member. The principle of the embodiment allows omitting reinforcement for a member around the deck member. Therefore, it is possible to reduce a weight of the vehicle body rear portion structure. Accordingly, the deck member may have a reduced thickness and high rigidity.

With regard to the aforementioned configuration, the deck member may include a panel, which is connected to an opening perimeter of a trunk room, and another panel, which surrounds the middle closed section in cooperation with the panel. The panel may be thinner than the other panel.

According to the aforementioned configuration, the deck member may have high rigidity. The deck member may also function as a panel forming the opening perimeter of the trunk room. Therefore, it is less likely to cause stress concentration on the trunk room. The principle of the embodiment is advantageous in reducing a load. Since the reduced load is transmitted, the principle of the embodiment may provide high rigidity to the vehicle body as a whole.

With regard to the aforementioned configuration, the connecting portion may form a connection closed section having a larger cross-section than the middle closed section. The connection closed section may be different in shape from the middle closed section.

According to the aforementioned configuration, the connecting portion of the deck member may function as a joint portion. Since the connection closed section has a larger cross-section than the middle closed section, the connecting portion of the deck member appropriately receives stress acting in different directions. The connecting portion appropriately receives a load from the damper, and smoothly transmits the load to both side portions of the deck member extending in the vehicle width direction. Accordingly, the principle of the embodiment provides a structure for appropriately receiving a load and distributing a stress.

With regard to the aforementioned configuration, the damper support portion may be situated on a lower front side of the deck member. The deck member may include a forward downward extension extending forward and downward with respect to a center portion of a cross-section of the middle closed section, an upward extension extending upward with respect to the center portion, and a rearward extension extending rearward with respect to the center portion.

According to the aforementioned configuration, the forward downward extension appropriately receives an input load from the damper support portion. Since the upward extension and the rearward extension reinforce the forward downward extension, it is less likely for the input load to cause displacement of the forward downward extension.

With regard to the aforementioned configuration, the deck member may include a connecting portion, which is connected to a damper support portion configured to support a damper. The deck member may form a middle closed section on a middle side than the connecting portion in the vehicle width direction, and an open section on an outer side than the connecting portion.

According to the aforementioned configuration, the damper support portion is connected by a member forming the middle closed section. Since the deck member forms the open section on the outer side than the connecting portion in the vehicle width direction, there is a local reduction in rigidity of the deck member. Therefore, it is less likely to cause stress concentration on a connecting portion between the deck member and a member around the deck member. The principle of the embodiment allows omitting reinforcement for a member around the deck member. There is a reduction in weight of the vehicle body rear portion structure. Accordingly, the deck member may have a reduced thickness and high rigidity.

With regard to the aforementioned configuration, a fuel supply port may be formed in a vehicle body side portion. The deck member may include a first end portion, which has a downward bent portion, the downward bent portion being bent downward so as to avoid the fuel supply port. The fuel supply port may overlap the downward bent portion in a side view of the vehicle. The downward bent portion may include a front wall, and a first upper wall extending in a vehicle front-rear direction on an inner side of the fuel supply port in the vehicle width direction. The front wall and the first upper wall form an L-shaped lateral cross-section of the downward bent portion.

According to the aforementioned configuration, since the fuel supply port overlaps the downward bent portion in the side view of the vehicle, there is an increase in the degree of freedom about a layout of the fuel supply port. The fuel supply port overlaps the downward bent portion. Therefore, it is less likely that a fuel feed pipe interferes with a space for the trunk room. Accordingly, the trunk room may have a large space. The downward bent portion includes the front wall and the first upper wall forming an L-shaped lateral cross-section. Therefore, the vehicle body may have high rigidity. In addition, it is possible to provide high rigidity for a portion of the vehicle body side portion where the fuel supply port is formed.

The upper rear member is situated at a position where the upper rear member overlaps the fuel supply port. Therefore, it is possible to secure a large space for installing an auxiliary device in front of the deck member. Even when the vehicle has a short vehicle body rear portion, it is possible to form a large space for installing an auxiliary device and a large trunk space. In addition, the vehicle body may have high rigidity.

INDUSTRIAL APPLICABILITY

The principle of the embodiment is applicable to a structure for supporting a deck cover.

This application is based on Japanese Patent Applications No. 2014-259783, No. 2014-259784, and No. 2014-259785 filed on Dec. 24, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A vehicle body rear portion structure for an automobile of which a rear deck cover of an open car is supported so that the rear deck cover opens or closes above a wheelhouse, comprising:
   a rear fender including an upper perimeter extending on an inner side in a vehicle width direction above the wheelhouse;
   a deck member extending in the vehicle width direction; and
   a support structure which supports the rear deck cover,
   wherein the upper perimeter is connected to the deck member,
   wherein the support structure includes a link mechanism, which opens and closes the rear deck cover, and a bracket portion including a mounting seat situated on an inner side with respect to a top portion of the wheelhouse in the vehicle width direction, the bracket portion supporting the link mechanism,
   wherein the link mechanism is supported on the wheelhouse via the bracket portion,
   wherein the bracket portion includes a first bracket connected to the wheelhouse, and a second bracket connected to the first bracket,
   wherein the link mechanism is mounted on the wheelhouse via the first and second brackets,
   wherein the mounting seat is situated substantially horizontally in the second bracket,
   wherein the second bracket includes a lower mounting portion extending downward from the mounting seat, and an outer mounting portion situated on an outer side than the mounting seat in the vehicle width direction,
   wherein the lower mounting portion is mounted obliquely to the first bracket in a vertical direction, and wherein the outer mounting portion is connected obliquely to the first bracket in the vehicle width direction.

2. The vehicle body rear portion structure for the automobile according to claim 1,
wherein the deck member includes a connecting portion, which is connected to a damper support portion configured to support a damper, and
wherein the deck member forms a middle closed section on a middle side than the connecting portion in the vehicle width direction, and an open section on an outer side than the connecting portion.

3. The vehicle body rear portion structure for the automobile according to claim 1,
wherein a fuel supply port is formed in a vehicle body side portion,
wherein the deck member includes a first end portion, which has a downward bent portion, the downward bent portion being bent downward so as to avoid the fuel supply port,
wherein the fuel supply port overlaps the downward bent portion in a side view of the vehicle,
wherein the downward bent portion includes a front wall, and a first upper wall extending in a vehicle front-rear direction on an inner side of the fuel supply port in the vehicle width direction, and
wherein the front wall and the first upper wall form an L-shaped lateral cross-section of the downward bent portion.

4. The vehicle body rear portion structure for the automobile according to claim 1,
wherein the first bracket includes front and rear outer mounting portions, which are mounted on the wheelhouse, and an inner joint portion, which is jointed to the wheelhouse on an inner side than the front and rear outer mounting portions in the vehicle width direction, and
wherein the outer mounting portions of the first and second brackets are situated on an extension of the inner joint portion.

5. The vehicle body rear portion structure for the automobile according to claim 1,
wherein the first bracket includes front and rear outer mounting portions, which are mounted on the wheelhouse, and an outer joint portion, which is joined to the wheelhouse on an outer side than the front and rear outer mounting portions in the vehicle width direction,
wherein front and rear closed sections are formed between the wheelhouse and each of the front and rear outer mounting portions,
wherein a connection closed section portion is formed, the connection closed section portion connecting the front and rear closed sections in a vehicle front-rear direction,
wherein a recess extending in the vehicle front-rear direction is formed between the connection closed section portion and the outer joint portion, and
wherein the recess is connected to an upper surface of the wheelhouse.

6. The vehicle body rear portion structure for the automobile according to claim 5,
wherein the first bracket includes an inner joint portion, which is jointed to the wheelhouse on an inner side than the front and rear outer mounting portions in the vehicle width direction, and wherein the outer mounting portions of the first and second brackets are situated on an extension of the inner joint portion.

7. The vehicle body rear portion structure for the automobile according to claim 5,
wherein a fuel supply port is formed in a vehicle body side portion,
wherein the deck member includes a first end portion, which has a downward bent portion, the downward bent portion being bent downward so as to avoid the fuel supply port,
wherein the fuel supply port overlaps the downward bent portion in a side view of the vehicle,
wherein the downward bent portion includes a front wall, and a first upper wall extending in the vehicle front-rear direction on an inner side of the fuel supply port in the vehicle width direction, and
wherein the front wall and the first upper wall form an L-shaped lateral cross-section of the downward bent portion.

8. The vehicle body rear portion structure for the automobile according to claim 7,
wherein the deck member includes a second end portion opposite to a side, where the downward bent portion is formed, in the vehicle width direction,
wherein the second end portion includes an upper rear member side portion provided with a second upper wall and an L-shaped lower wall,
wherein the upper rear member side portion includes an opening portion between the second upper wall and the lower wall, and
wherein the opening portion allows insertion of an auxiliary device from a trunk room into a cabin.

9. The vehicle body rear portion structure for the automobile according to claim 8, further comprising:
an auxiliary device storage portion in which the auxiliary device is stored,
wherein the auxiliary device storage portion is situated behind the link mechanism.

10. The vehicle body rear portion structure for the automobile according to claim 7,
wherein the deck member includes a connecting portion, which is connected to a damper support portion configured to support a damper, and
wherein the deck member forms a middle closed section on a middle side than the connecting portion in the vehicle width direction, and an open section on an outer side than the connecting portion.

11. The vehicle body rear portion structure for the automobile according to claim 10,
wherein the deck member includes a panel, which is connected to an opening perimeter of a trunk room, and another panel, which surrounds the middle closed section in cooperation with the panel, and
wherein the panel is thinner than the other panel.

12. The vehicle body rear portion structure for the automobile according to claim 10,
wherein the connecting portion forms a connection closed section having a larger cross-section than the middle closed section, and
wherein the connection closed section is different in shape from the middle closed section.

13. The vehicle body rear portion structure for the automobile according to claim 10,
wherein the damper support portion is situated on a lower front side of the deck member, and wherein the deck member includes a forward downward extension extending forward and downward with respect to a center portion of the middle closed section, an upward extension extending upward with respect to the center portion, and a rearward extension extending rearward with respect to the center portion.

14. A vehicle body rear portion structure for an automobile of which a rear deck cover of an open car is supported so that the rear deck cover opens or closes above a wheelhouse, comprising:
a rear fender including an upper perimeter extending on an inner side in a vehicle width direction above the wheelhouse;
a deck member extending in the vehicle width direction; and
a support structure which supports the rear deck cover,
wherein the upper perimeter is connected to the deck member,
wherein the support structure includes a link mechanism, which opens and closes the rear deck cover, and a bracket portion including a mounting seat situated on an inner side with respect to a top portion of the wheelhouse in the vehicle width direction, the bracket portion supporting the link mechanism,
wherein the link mechanism is supported on the wheelhouse via the bracket portion,
wherein the deck member includes a connecting portion, which is connected to a damper support portion configured to support a damper, and
wherein the deck member forms a middle closed section on a middle side than the connecting portion in the vehicle width direction, and an open section on an outer side than the connecting portion.

15. A vehicle body rear portion structure for an automobile of which a rear deck cover of an open car is supported so that the rear deck cover opens or closes above a wheelhouse, comprising:
a rear fender including an upper perimeter extending on an inner side in a vehicle width direction above the wheelhouse;
a deck member extending in the vehicle width direction; and
a support structure which supports the rear deck cover,
wherein the upper perimeter is connected to the deck member,
wherein the support structure includes a link mechanism, which opens and closes the rear deck cover, and a bracket portion including a mounting seat situated on an inner side with respect to a top portion of the wheelhouse in the vehicle width direction, the bracket portion supporting the link mechanism,
wherein the link mechanism is supported on the wheelhouse via the bracket portion,
wherein a fuel supply port is formed in a vehicle body side portion,
wherein the deck member includes a first end portion, which has a downward bent portion, the downward bent portion being bent downward so as to avoid the fuel supply port,
wherein the fuel supply port overlaps the downward bent portion in a side view of the vehicle,
wherein the downward bent portion includes a front wall, and a first upper wall extending in a vehicle front-rear direction on an inner side of the fuel supply port in the vehicle width direction, and
wherein the front wall and the first upper wall form an L-shaped lateral cross-section of the downward bent portion.

* * * * *